United States Patent
Runde et al.

(10) Patent No.: US 9,448,684 B2
(45) Date of Patent: Sep. 20, 2016

(54) METHODS, SYSTEMS AND APPARATUS FOR SETTING A DIGITAL-MARKING-DEVICE CHARACTERISTIC

(71) Applicant: Sharp Laboratories of America (SLA), Inc., Camas, WA (US)

(72) Inventors: Neil Runde, Brush Prairie, WA (US); Andrew Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1 day.

(21) Appl. No.: 13/623,896

(22) Filed: Sep. 21, 2012

(65) Prior Publication Data

US 2014/0085209 A1    Mar. 27, 2014

(51) Int. Cl.
*G06F 3/0481* (2013.01)
*G06F 3/0488* (2013.01)

(52) U.S. Cl.
CPC .......... *G06F 3/0481* (2013.01); *G06F 3/0488* (2013.01); *G06F 2203/04808* (2013.01)

(58) Field of Classification Search
CPC .......... G06F 2203/04808; G06F 2203/04106; G06F 2203/04104; G06F 3/0481; G06F 3/0488
USPC ........................................ 345/156, 173, 179
See application file for complete search history.

(56) References Cited

U.S. PATENT DOCUMENTS

| 5,731,801 | A | 3/1998 | Fukuzaki |
| 6,654,008 | B2 | 11/2003 | Ikeda et al. |
| 7,385,595 | B2 | 6/2008 | Bryborn et al. |
| 8,860,675 | B2 * | 10/2014 | Wang et al. ............... 345/173 |
| 2003/0095113 | A1 | 5/2003 | Ma et al. |
| 2005/0052427 | A1 | 3/2005 | Wu et al. |
| 2010/0053111 | A1 | 3/2010 | Karlsson |
| 2011/0122080 | A1 * | 5/2011 | Kanjiya ...................... 345/173 |
| 2011/0169756 | A1 | 7/2011 | Ogawa et al. |
| 2013/0093664 | A1 * | 4/2013 | Nishidate .................... 345/156 |
| 2013/0125068 | A1 * | 5/2013 | Harris et al. ................ 715/863 |
| 2013/0132903 | A1 * | 5/2013 | Krishnaswamy ... G06F 3/04883 715/825 |
| 2013/0346924 | A1 * | 12/2013 | Morrill et al. .............. 715/863 |

FOREIGN PATENT DOCUMENTS

WO    2010/117103 A1    10/2010

OTHER PUBLICATIONS

Ken Hinckley, et al., "Manual Deskterity: An Exploration of Simultaneous Pen + Touch Direct Input," CHI 2010, Apr. 10-15, Atlanta, Georgia, USA.

* cited by examiner

*Primary Examiner* — Quan-Zhen Wang
*Assistant Examiner* — Xuemei Zheng
(74) *Attorney, Agent, or Firm* — Law Office of Gerald Maliszewski; Gerald Maliszewski

(57) ABSTRACT

Aspects of the present invention are related to systems, methods and apparatus for setting a drawing characteristic of a digital marking device. According to a first aspect of the present invention, detection of a touch gesture simultaneous to engagement of a digital marking device with a digital mark surface may effectuate a drawing-context interpretation of the touch gesture. A characteristic of the digital marking device may be set according to the drawing-context interpretation of the touch gesture.

5 Claims, 18 Drawing Sheets

METHODS, SYSTEMS AND APPARATUS FOR SETTING A DIGITAL-MARKING-DEVICE CHARACTERISTIC

FIELD OF THE INVENTION

Aspects of the present invention relate generally to a digital-marking-surface method, system and apparatus, and more particularly, aspects of the present invention relate to methods, systems and apparatus for setting a drawing characteristic of a digital marking device.

BACKGROUND

A digital-marking-surface apparatus may comprise a digital marking surface on which a user may place a digital mark and on which other digital content may be displayed. Digital marks may be placed by a user using a digital marking device.

Typically, a section of a digital marking surface may be used to display a command strip comprising command icons associated with digital-marking-device display characteristics, for example, stroke width, color, fill color, fill pattern, border style, opacity and other drawing characteristics, associated with a digital marking device.

Methods, systems and apparatus in which it is not necessary to activate a command strip to set a digital-marking-device characteristic may be desirable.

SUMMARY

Some embodiments of the present invention comprise methods, systems and apparatus for setting a drawing characteristic of a digital marking device.

Detection of a touch gesture simultaneous to engagement of a digital marking device with a digital mark surface may effectuate a drawing-context interpretation of the touch gesture. A characteristic of the digital marking device may be set according to the drawing-context interpretation of the touch gesture.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 15:
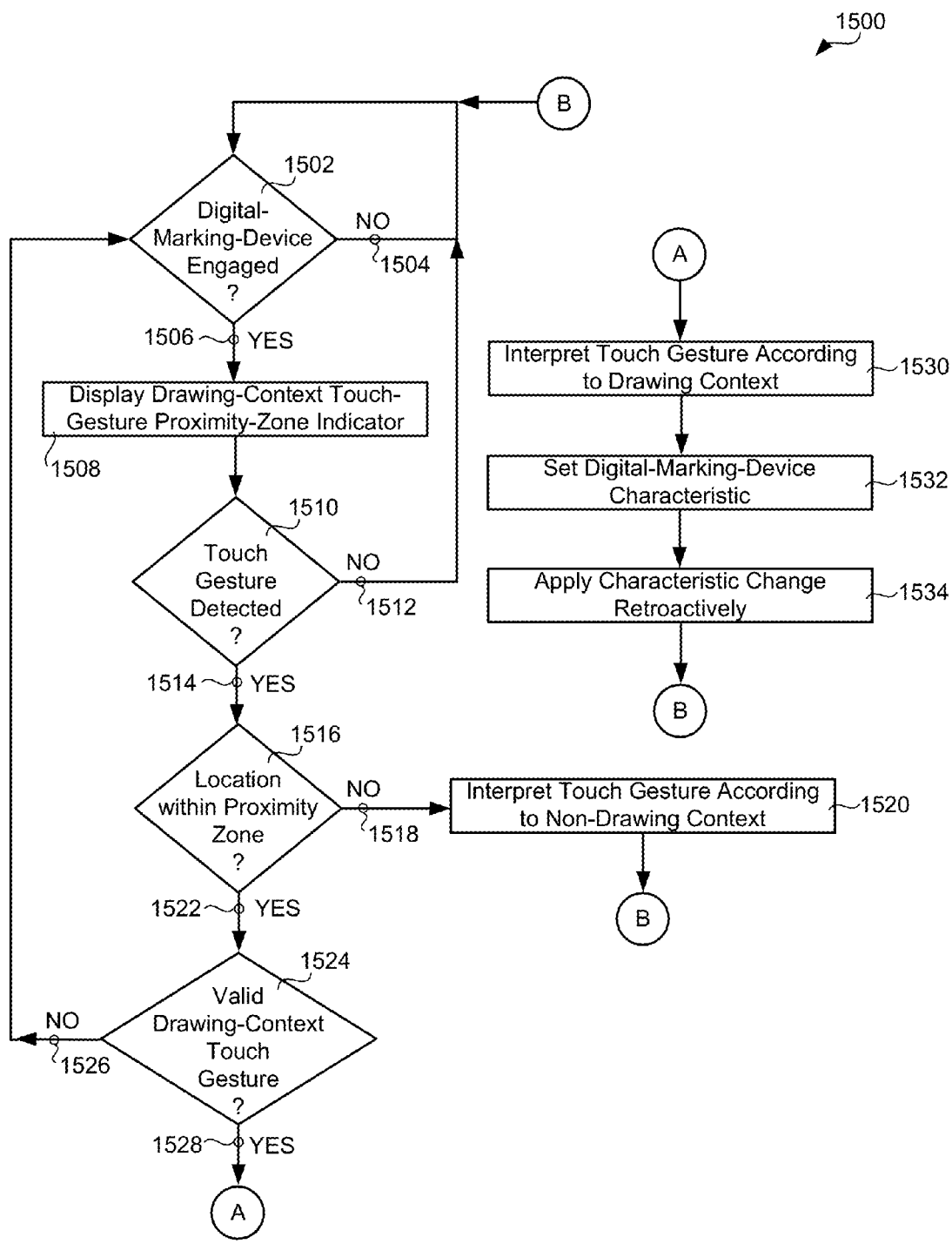
Figure 16A:
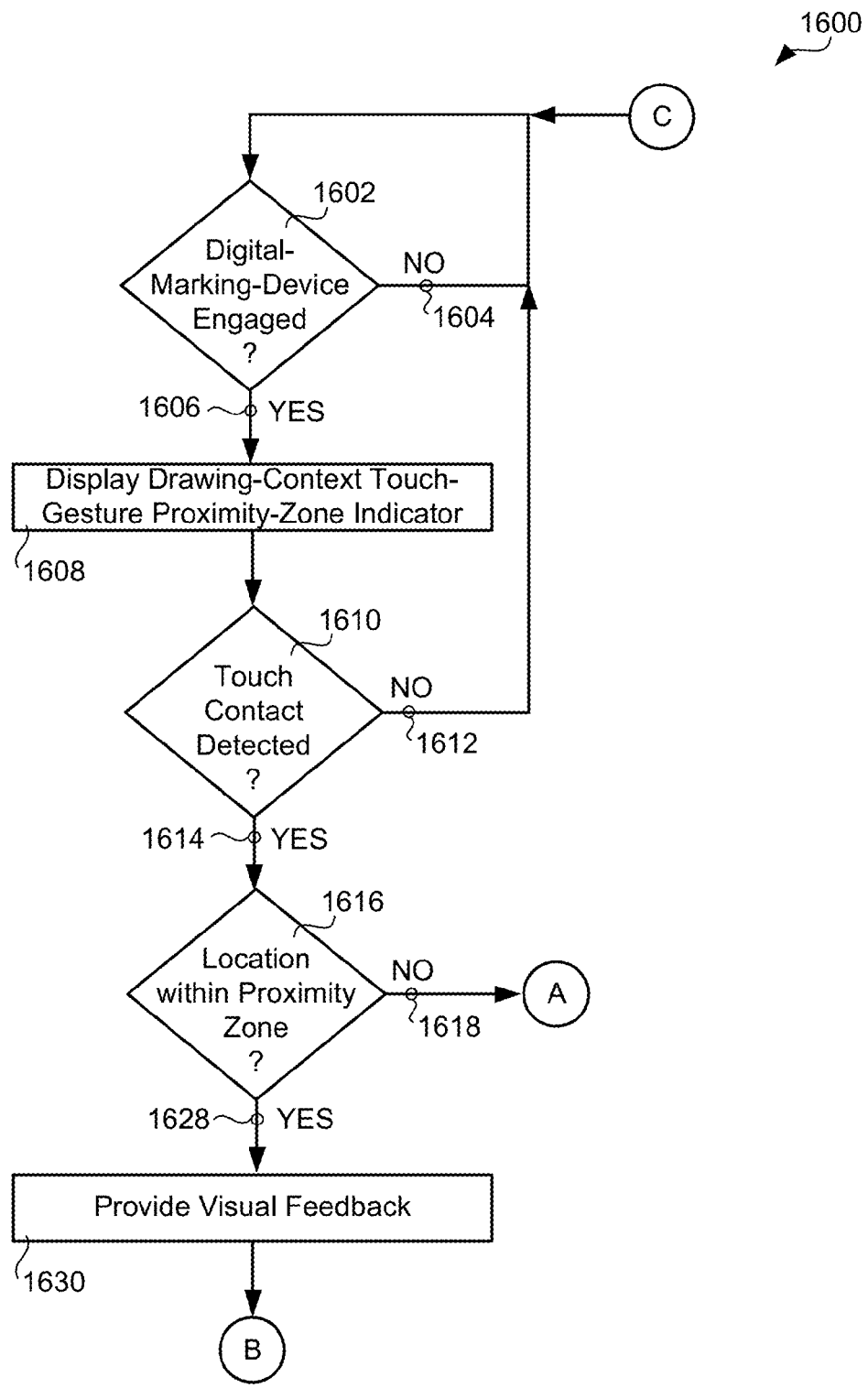
Figure 16B:
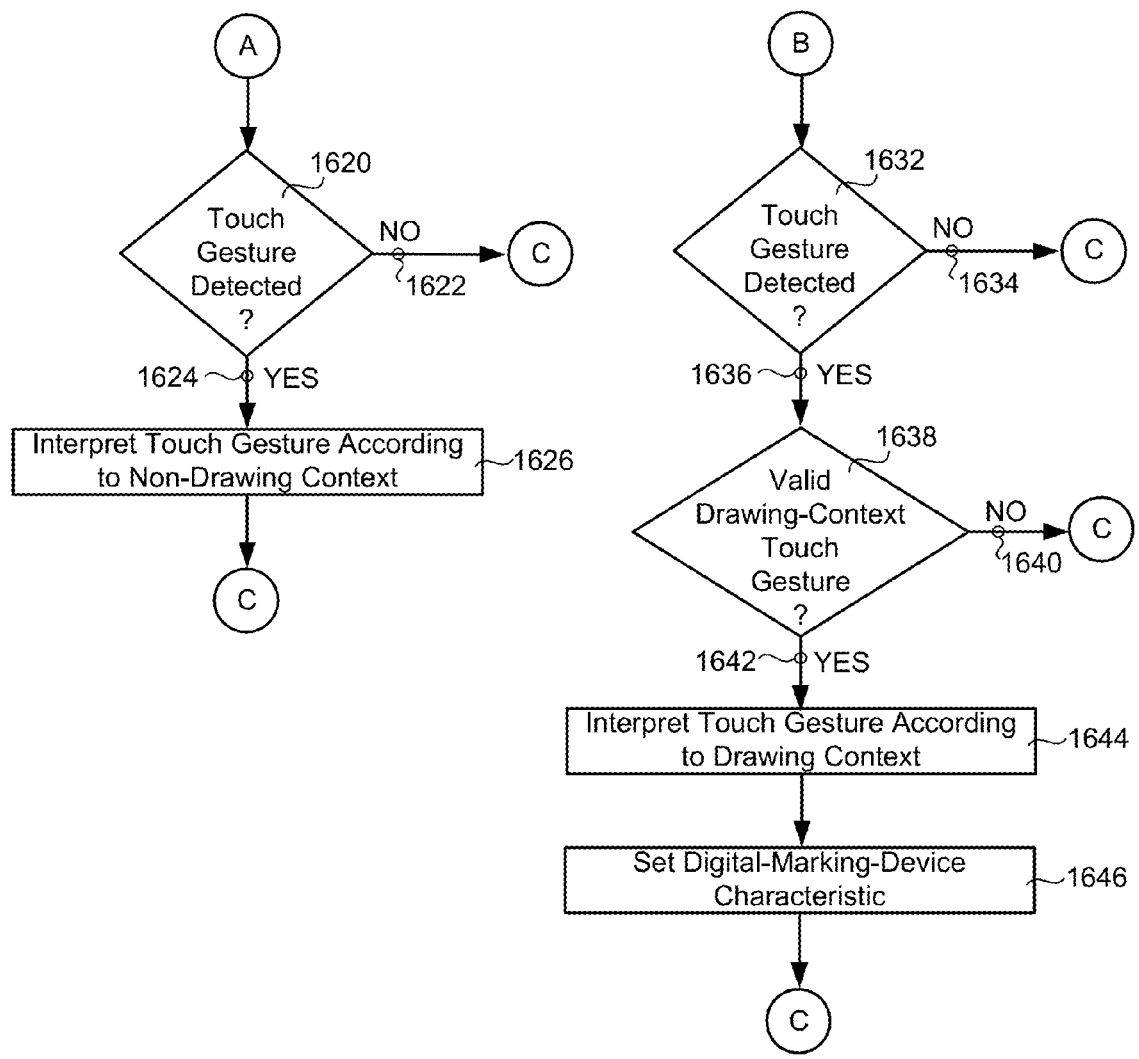
Figure 17A:
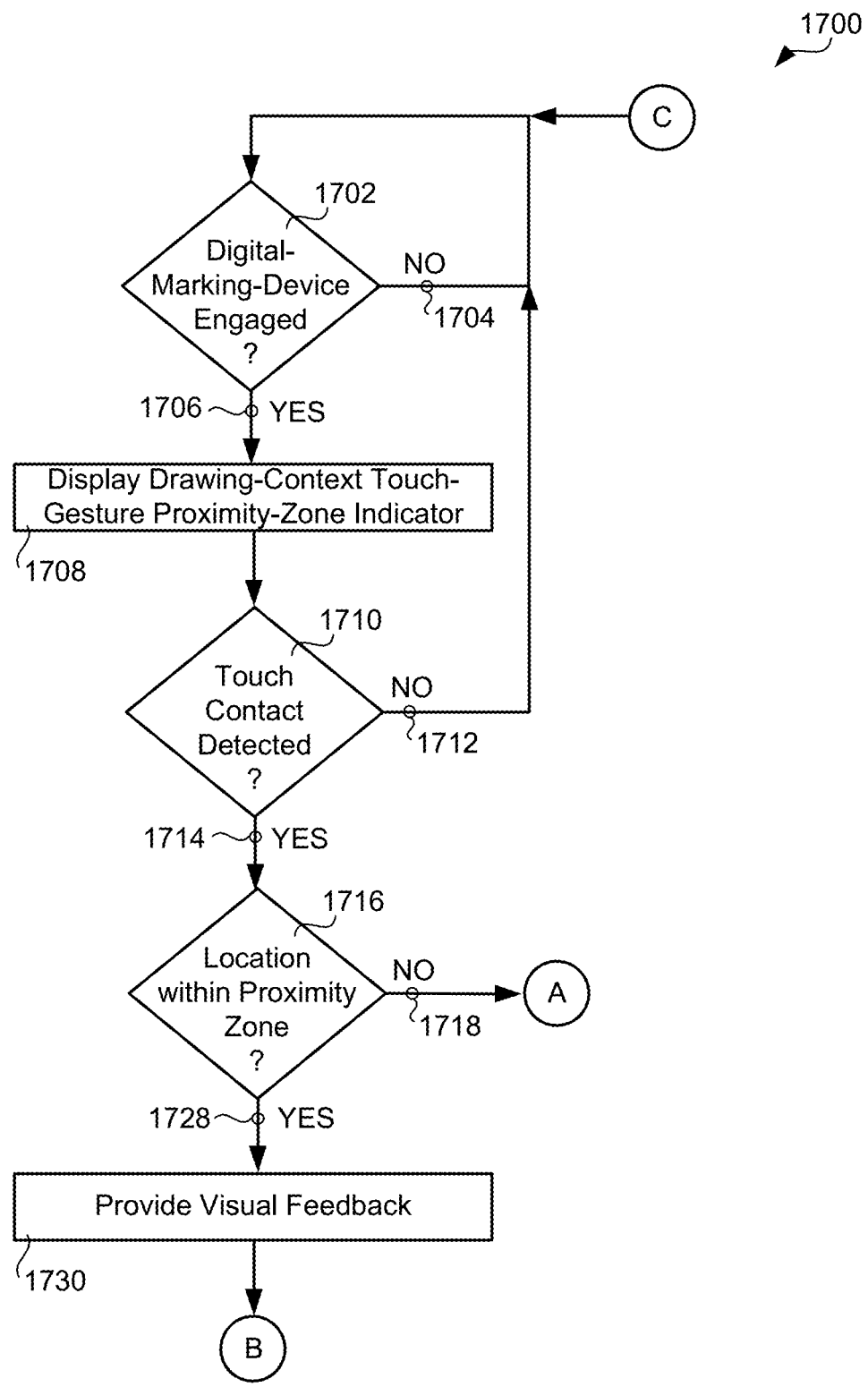
Figure 17B:
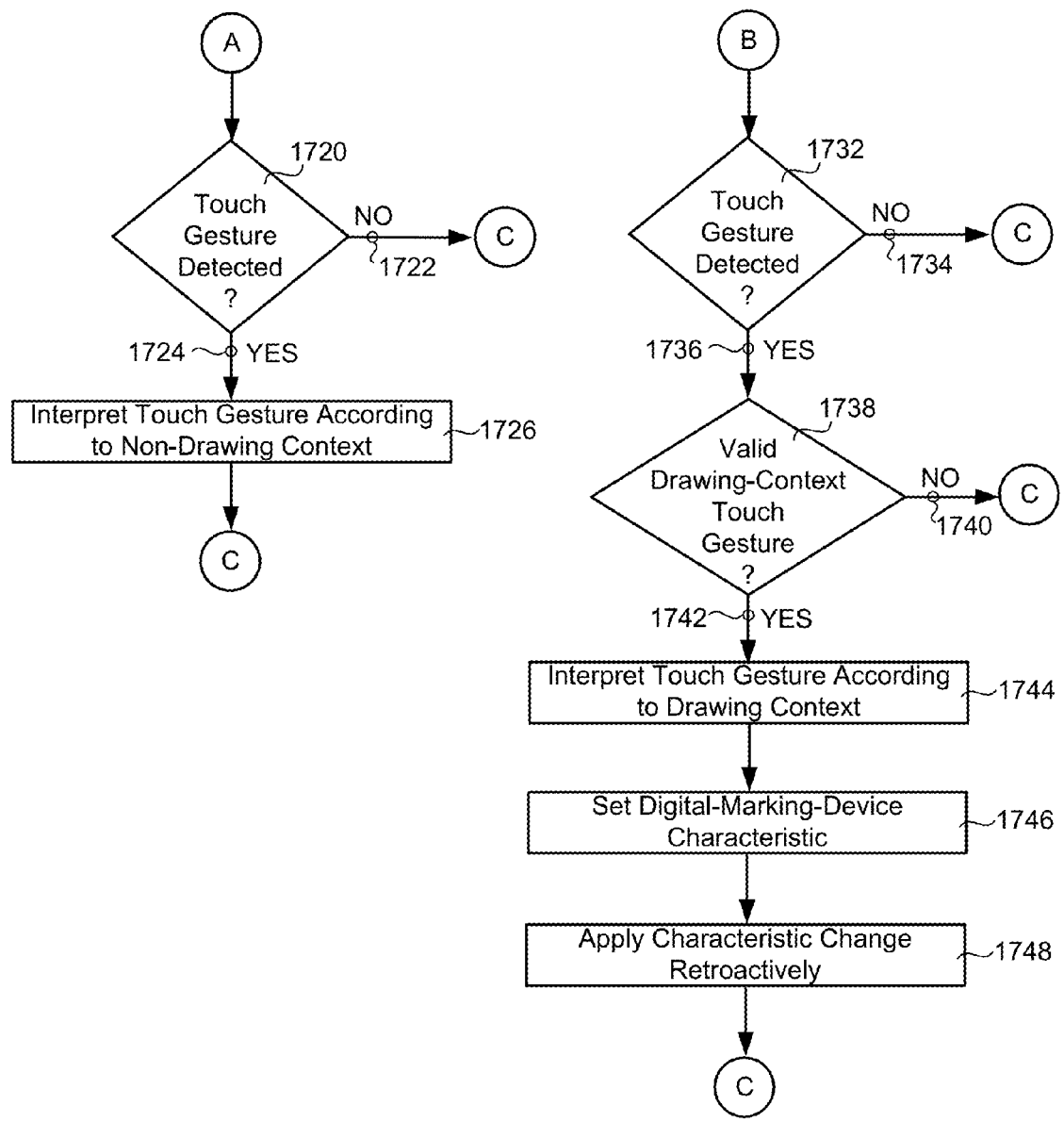
Figure 18A:
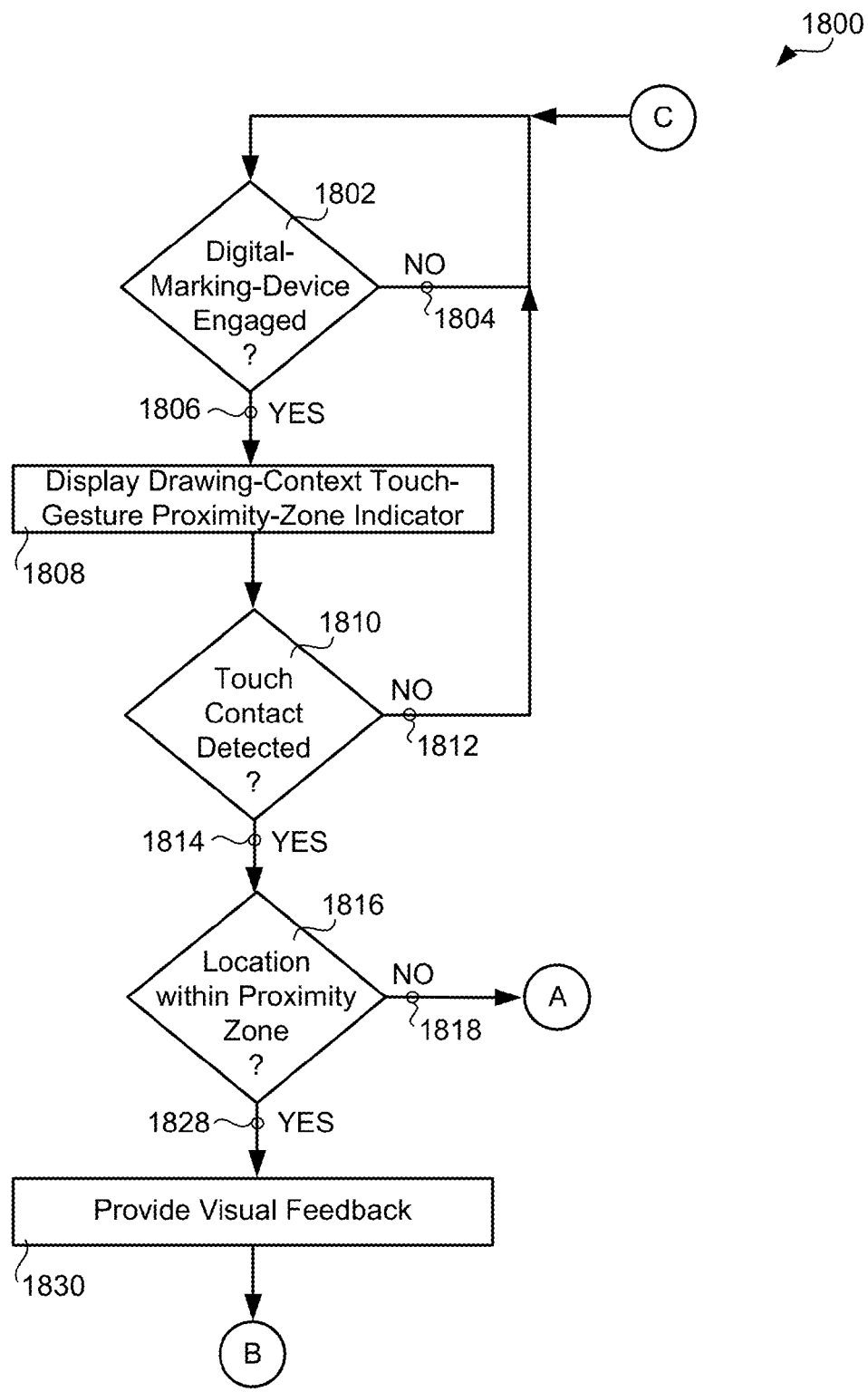
Figure 18B:
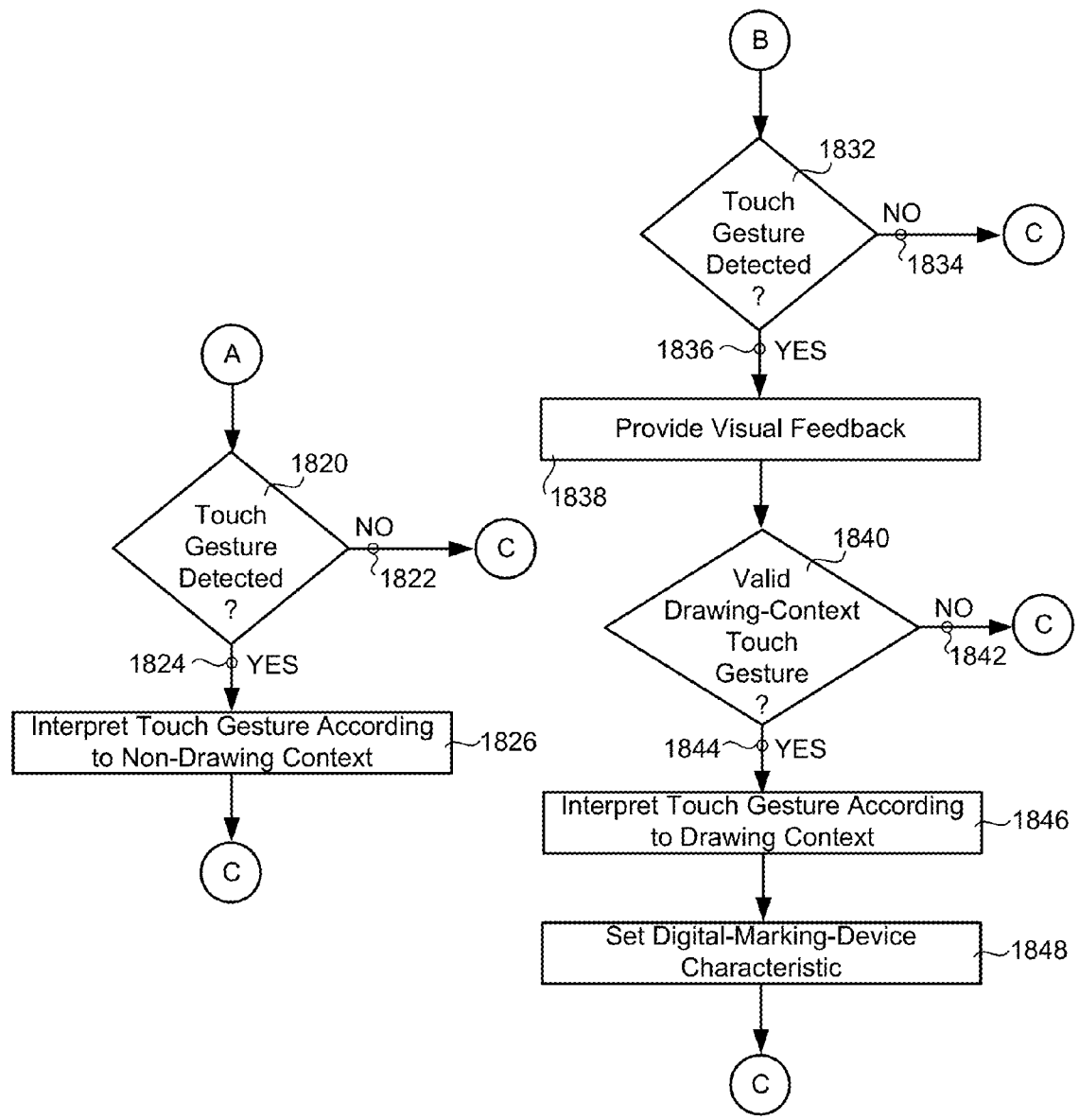
Figure 19A:
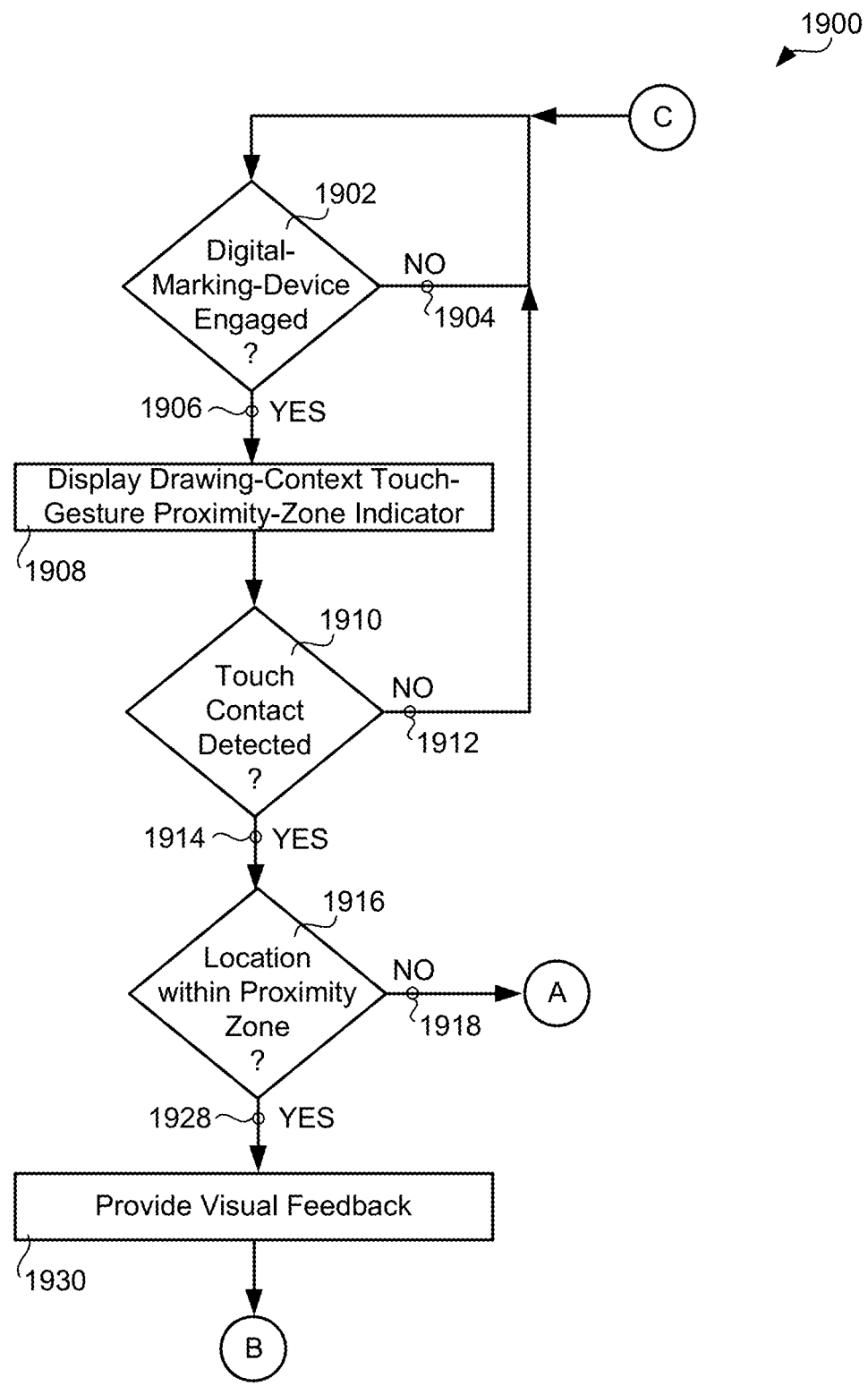
Figure 19B:
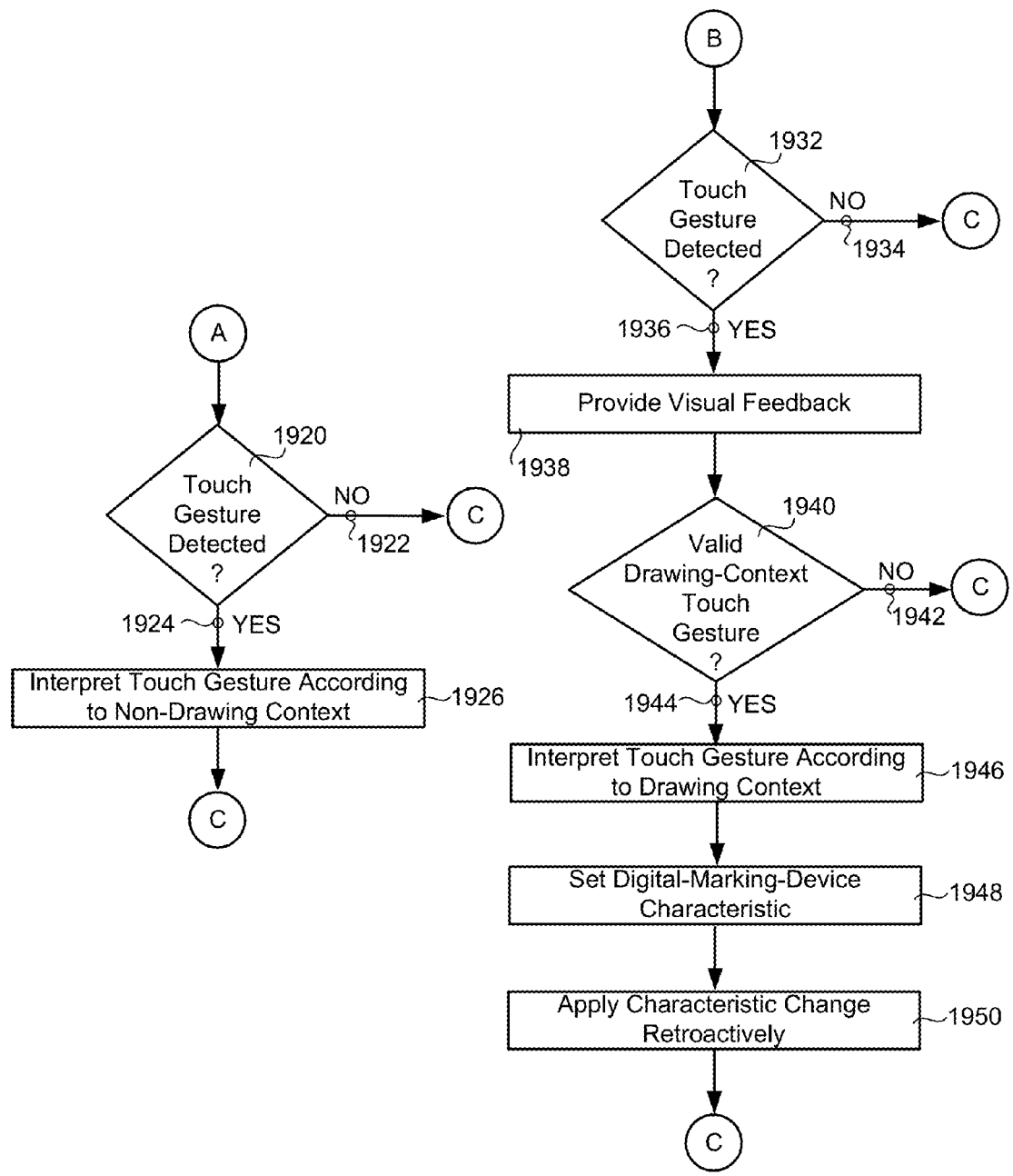

FIG. 15 is a chart depicting exemplary embodiments of the present invention comprising interpretation of a touch gesture in a drawing context when the touch gesture is performed while a digital marking device is engaged with a digital marking surface and when the touch gesture is made within a proximity zone associated with the current engagement point of the digital marking device, wherein application of a digital-marking-device characteristic associated with the drawing-context touch-gesture interpretation is made retroactively;

FIGS. 16A and 16B are a chart depicting exemplary embodiments of the present invention comprising visual feedback in response to touch contact;

FIGS. 17A and 17B are a chart depicting exemplary embodiments of the present invention comprising visual feedback in response to touch contact, and retroactively applying a digital-marking-device characteristic associated with a drawing-context touch-gesture interpretation;

FIGS. 18A and 18B are a chart depicting exemplary embodiments of the present invention comprising visual feedback in response to touch gesture; and FIGS. 19A and 19B are a chart depicting exemplary embodiments of the present invention comprising visual feedback in response to touch gesture, and retroactively applying a digital-marking-device characteristic associated with a drawing-context touch-gesture interpretation.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

A digital-marking-surface apparatus may comprise a digital marking surface on which a user may place one, or more, digital marks and on which other digital content may be displayed. Digital marks may be placed by a user using a digital marking device.

Typically, a section of a digital marking surface may be used to display a command strip comprising command icons associated with digital-marking-device display characteristics, for example, stroke width, color, fill color, fill pattern, border style, opacity and other drawing characteristics, associated with a digital marking device.

Methods, systems and apparatus in which it is not necessary to activate a command strip to set a digital-marking-device characteristic may be desirable.

Figure 1:
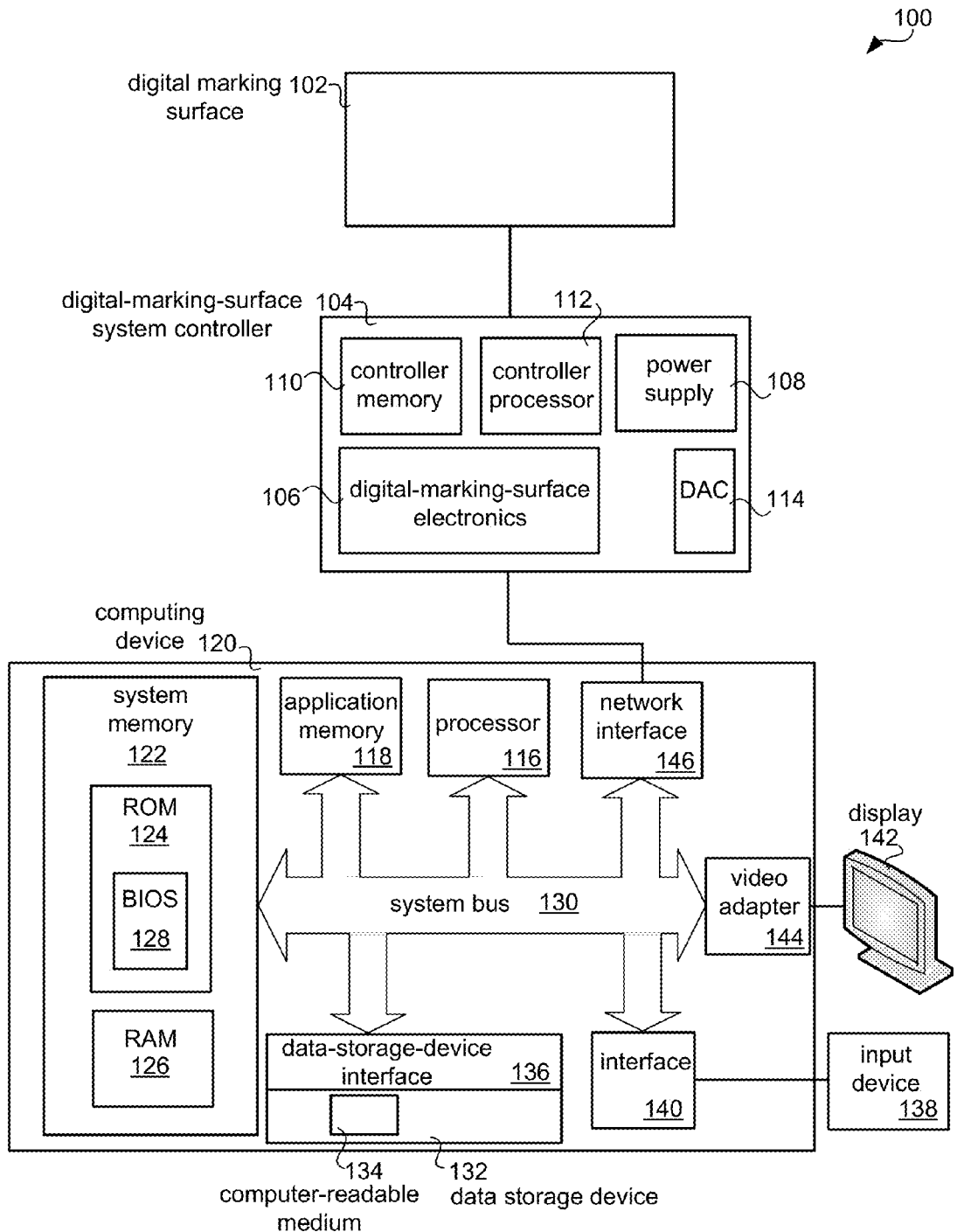
FIG. 1 is a picture illustrating an exemplary digital-marking-surface system according to some embodiments of the present invention.

FIG. 1 illustrates an exemplary digital-marking-surface system 100 according to embodiments of the present invention. The digital-marking-surface system 100 may comprise a digital marking surface 102, for example, an interactive whiteboard, a touch-screen display, a tablet personal computer (PC), a surface computer or another digital marking surface. Some embodiments of the present invention may comprise a sensing technology for tracking an interaction on the digital marking surface 102. Exemplary sensing technologies include resistive sensing technologies, capacitive sensing technologies, active electromagnetic sensing technologies, passive electromagnetic sensing technologies, optical sensing technologies, for example, infrared based, laser based, camera based and other optical-based sensing technologies, ultrasonic sensing technologies, dispersive signal technologies and other sensing technologies.

A user may place a digital mark on the digital marking surface 102 using a digital input device, for example, a mouse, a keyboard, a stylus, a specialized marking-device pen, a finger or other marking device capable of inputting a digital-ink mark on the digital marking surface 102. The digital marking surface 102 may also display digital images and other digital content.

The digital-marking-surface system 100 may comprise a digital-marking-surface system controller 104 for controlling the digital-marking-surface system 100. The digital-marking-surface system controller 104 may comprise digital-marking-surface electronics 106 for controlling the digital marking surface 102, for making measurements from the digital marking surface 102 and for other control functions associated with the digital-marking-surface system 100. The digital-marking-surface system controller 104 may comprise a power supply 108, a controller memory 110, a controller processor 112 and a digital-to-analog converter (DAC) 114. In some embodiments of the present invention (not shown), the digital-marking-surface system controller 104 may be physically integrated into a single apparatus with the digital marking surface 102. In alternative embodiments, the digital-marking-surface system controller 104 may be physically separate from, but electronically connected to, the digital marking surface 102.

The digital-marking-surface system 100 may comprise a processor 116 and an application memory 118. In some embodiments of the present invention (not shown), the processor 116 and the application memory 118 may be physically integrated into a single apparatus with the digital marking surface 102. In alternative embodiments of the present invention (not shown), the processor 116 and the application memory 118 may be physically integrated into a single apparatus with the digital-marking-surface system controller 104. In yet alternative embodiments of the present invention, the processor 116 and the application memory 118 may be separate from, but electronically connected to, one, or both, of the digital marking surface 102 and the digital-marking-surface system controller 104. In some embodiments of the present invention, the processor 116 and application memory 118 may reside in a computing device 120.

An exemplary computing device 120 may comprise system memory 122, which may comprise read-only memory (ROM) 124 and random-access memory (RAM) 126. The exemplary computing device 120 may comprise a basic input/output system (BIOS) 128, which may reside in ROM 124, for controlling the transfer of information between the components of the computing device 120 via a system bus 130. The exemplary computing device 120 may comprise one, or more, data storage devices (one shown) 132, for example, a hard disk drive, a magnetic disk drive, an optical disk drive or other data storage device, for reading from and writing to a computer-readable medium (one shown) 134, for example, a hard disk, an optical disk, a magnetic disk or other computer-readable medium. The exemplary computing device 120 may also comprise an associated data-storage-device interface 136 for connecting the data storage device 132 to the system bus 130.

A digital-marking-surface application program may be stored on the read-only memory 124, on the random-access memory 126 or on the one, or more, data storage devices 132. The digital-marking-surface application program may comprise instructions that, when executed, may control the digital-marking-surface system 100, may process input from the digital marking surface 102, may effectuate changes in the content displayed on the digital marking surface 102 and may otherwise implement a digital-marking-surface application program.

The exemplary computing device 120 may comprise an input device 138, for example, a mouse, a keyboard, a joystick or other input device, which may be connected, to the system bus 130, via an interface 140, for example, a parallel port, game port, universal serial bus or other interface.

The exemplary computing device 120 may comprise a display 142, which may be connected, via a video adapter 144, to the system bus 130.

The exemplary computing device 120 may be communicatively coupled with the digital-marking-surface system controller 104 via a network interface 146 or other communication connection.

Figure 2:
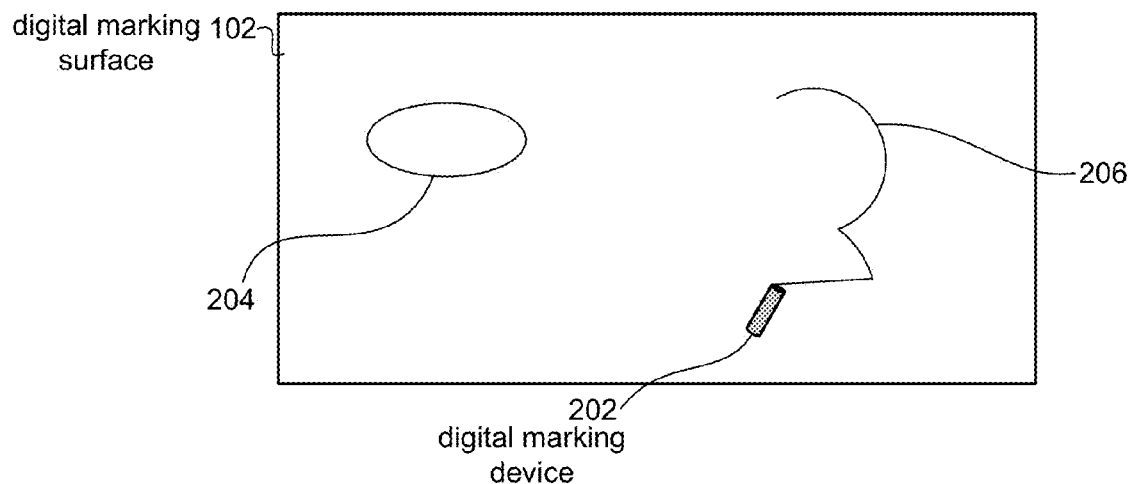
FIG. 2 is a picture illustrating exemplary digital marks on a digital marking surface.

Some embodiments of the present invention may be understood in relation to FIG. 2. A digital marking device 202, also considered a digital marking pen, may be used to mark, two marks shown 204, 206, a digital marking surface 102, for example, an interactive whiteboard, a touch-screen display on a tablet, or other, device, a surface computer and other digital marking surfaces. When the digital marking device 202 is engaged, for example, in contact with the digital marking surface 102, sensed in proximity to the digital marking surface 102 or otherwise enabled to mark the digital marking surface 102, a touch gesture on the digital marking surface 102 may be interpreted in relation to the digital marking device 202, thereby changing the digital-marking-device display characteristics, for example, stroke width, stroke type, stroke color, fill color, fill pattern, border style, opacity and other drawing characteristics associated with the digital marking device 202.

In some embodiments of the present invention, a touch gesture comprising a single-finger tap on the digital marking surface 102 may change the stroke type, associated with the digital marking device, from a continuous line to a dotted line. In alternative embodiments, a touch gesture comprising a single-finger tap on the digital marking surface 102 may toggle between two, or more, stroke types. In yet alternative embodiments of the present invention, a touch gesture comprising a number of single-finger taps on the digital marking surface 102 may be used to set the type of dotted line.

In some embodiments of the present invention, a touch gesture comprising a two-finger pinch/expansion gesture on the digital marking surface 102 may change the stroke width. In some embodiments, a two-finger pinch gesture on the digital marking surface 102 may cause the stroke width to narrow. In some embodiments, a two-finger expansion gesture on the digital marking surface 102 may cause the stroke width to widen.

In some embodiments of the present invention, a rubbing gesture on the digital marking surface 102 may cause the removal of digital marks from the digital marking surface 102.

In some embodiments of the present invention, a double-finger drag gesture, on the digital marking surface 102, in a first direction may set increasing mark transparency. While a double-finger drag gesture in the opposite direction may set decreasing mark transparency.

In some embodiments of the present invention, a single-finger spiral-shaped touch gesture on the digital marking surface 102 may progress through a color palette selecting a mark color based on the termination of the spiral sweep. In alternative embodiments of the present invention, a single-finger lateral-swipe touch gesture on the digital marking surface 102 may progress through a color palette selecting a mark color based on the termination of the lateral swipe.

In some embodiments of the present invention, a double-finger double-tap touch gesture on the digital marking surface 102 may effectuate removal, from the digital marking surface 102, of the last digital marking pen stroke.

In some embodiments of the present invention, a touch gesture may incorporate a hand gesture, for example, a single-finger single-tap touch gesture on the digital marking surface 102 combined with a hand-waving gesture of the hand holding the digital marking device. Such a gesture may effectuate an undo, from the digital marking surface 102, of the last digital-marking-device characteristic setting.

The above-described touch gestures and resulting digital-marking-device characteristic settings are exemplary and not intended to limit the scope of the present invention.

In some embodiments of the present invention, the detection of a touch gesture, while a digital marking device 202 is engaged, may effectuate a digital-marking-device characteristic change for digital marks placed on the digital marking surface 102 from that point in time forward, until another characteristic-changing event is detected. In alternative embodiments of the present invention, the detection of a touch gesture, while the digital marking device 202 is engaged, may effectuate a digital-marking-device characteristic change for digital marks previously placed on the digital marking surface 102. In some of these embodiments, the digital-marking-device characteristic may be applied retroactively to digital marks made during a current time period of continuous digital-marking-device engagement. In alternative of these embodiments the digital-marking-device characteristic may be applied retroactively to digital marks made during an alternative duration, for example, a duration associated with a current user, a duration associated with a marking color, a duration associated with a marking pattern, for example, a bulleted list, a numbered list and other marking patterns, or other duration.

Figure 3:
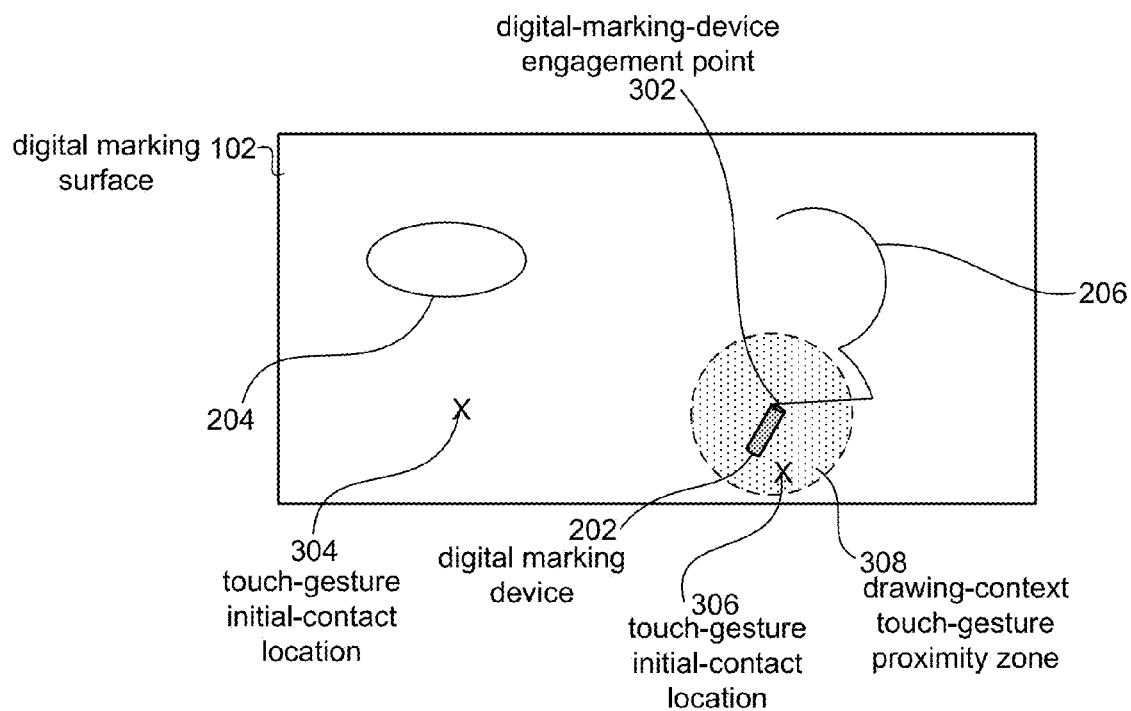
FIG. 3 is a picture illustrating the relationship between a digital marking device and a drawing-context touch-gesture proximity zone according to some embodiments of the present invention.

Some embodiments of the present invention may be understood in relation to FIG. 3. A digital marking device 202 may be used to place a digital mark, two shown 204, 206, on a digital marking surface 102. The detection of a touch gesture, while the digital marking device 202 is engaged, may effectuate a digital-marking-device characteristic change, for digital marks placed on the digital marking surface 102, when the touch gesture is detected in proximity to the current digital-marking-device engagement point 302, wherein the current digital-marking-device engagement point 302 is the point, on the digital marking surface 102, at which the digital marking device 202 is currently detected. Thus, a touch gesture detected distal to the current digital-marking-device engagement point 302, for example at touch-gesture initial-contact location 304, may be interpreted in a non-drawing context. While, a touch gesture detected proximal to the current digital-marking-device engagement point 302, for example at touch-gesture initial-contact location 306, may be interpreted in a drawing context that may effectuate a digital-marking-device characteristic change.

In some embodiments of the present invention, a touch gesture may be considered detected in a drawing-context touch-gesture proximity zone 308 when an initial touch contact associated with the touch gesture is located in the drawing-context touch-gesture proximity zone 308. For example, a two-finger pinch or spread touch gesture may be considered in the drawing-context touch-gesture proximity zone 308 when the initial contact of either figure is detected within the drawing-context touch-gesture proximity zone 308, regardless of the terminating location of the gesture or the initial contact location of the second finger. In some embodiments of the present invention, a circular drawing-context touch-gesture proximity zone 308 may be defined in relation to the current digital-marking-device engagement point 302. A touch gesture detected within the drawing-context touch-gesture proximity zone 308 may be interpreted according to a drawing context. Alternative embodiments may comprise other-shaped drawing-context touch-gesture proximity zones. In some embodiments, the drawing-context touch-gesture proximity zone may be a closed polygon region encompassing a set of digital marks and the digital-marking-device engagement point.

In some embodiments of the present invention, a drawing-context touch-gesture proximity zone may be indicated on a digital marking surface by a faint perimeter marking, or other indicator, in relation to the current digital-marking-device engagement point. In alternative embodiments of the present invention, a drawing-context touch-gesture proximity zone may be indicated on a digital marking surface by a faint perimeter marking, or other indicator, in relation to the current digital-marking-device engagement point only when the digital marking device is engaged and a touch contact is detected. In alternative embodiments of the present invention, a drawing-context touch-gesture proximity zone may be indicated on a digital marking surface by a faint perimeter marking, or other indicator, in relation to the current digital-marking-device engagement point only when the digital marking device is engaged and a touch contact is detected within the drawing-context touch-gesture proximity zone. In some embodiments of the present invention, a drawing-context touch-gesture proximity-zone indicator may be rendered to be seen only by the digital-marking-device user.

Figure 4:
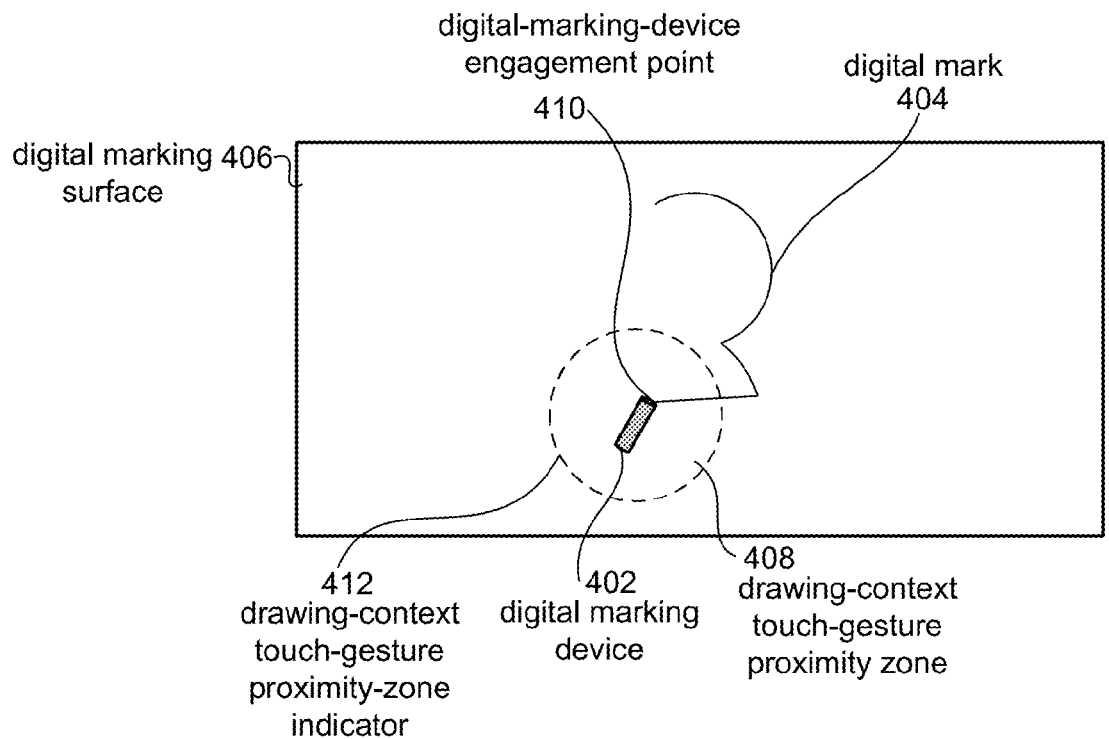
FIG. 4 is a picture illustrating the relationship between a drawing-context touch-gesture proximity zone and a drawing-context touch-gesture proximity-zone indicator according to some embodiments of the present invention.
Figure 5:
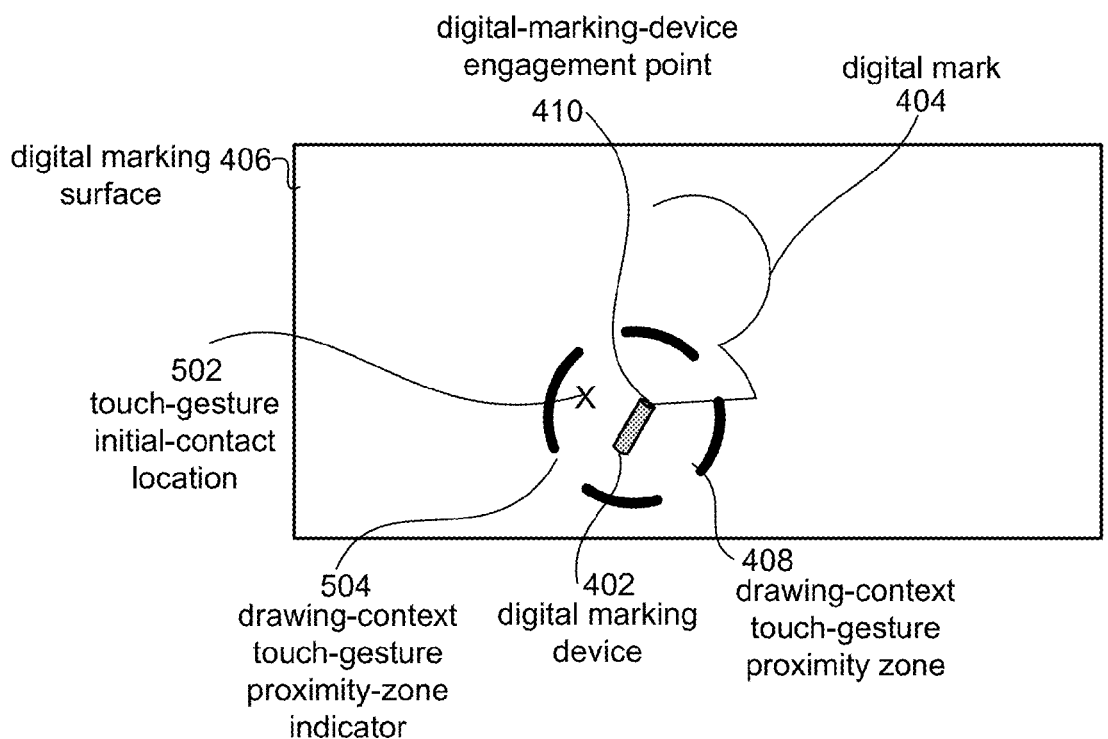
FIG. 5 is a picture illustrating modification of a drawing-context touch-gesture proximity-zone indicator in response to an initial touch-gesture contact according to some embodiments of the present invention.
Figure 6:
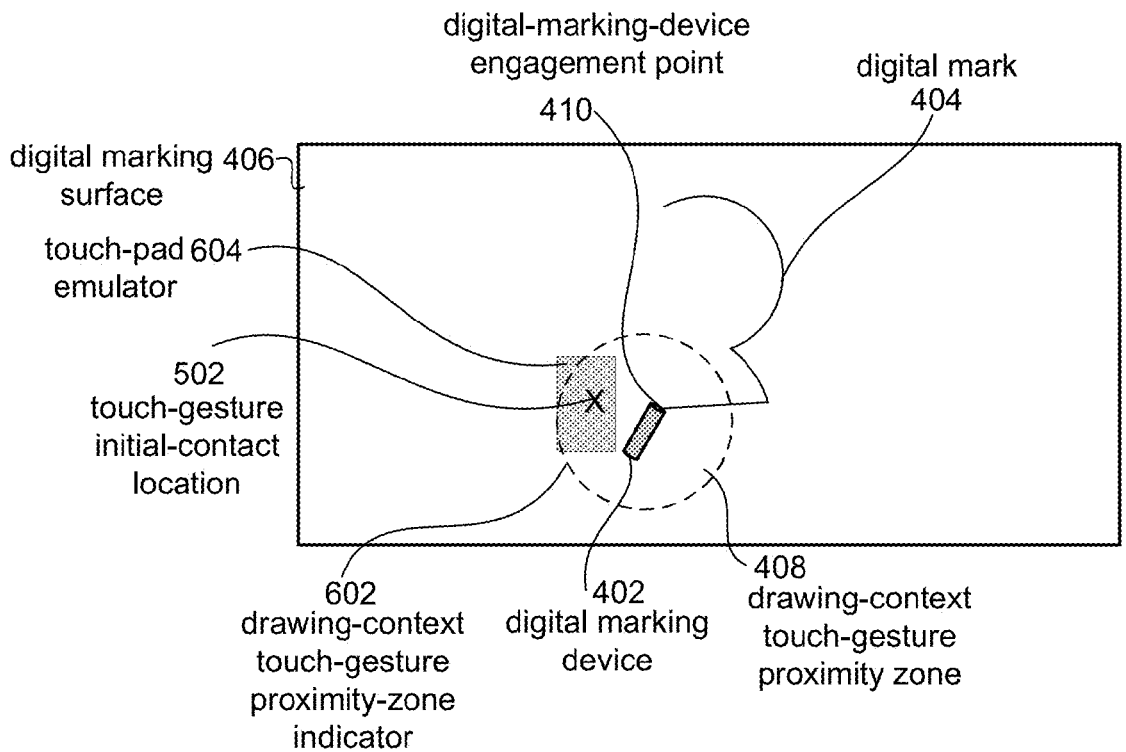
FIG. 6 is a picture illustrating a touch-pad emulator according to some embodiments of the present invention.

Some embodiments of the present invention may be understood in relation to FIGS. 4-6. A digital marking device 402 may be used to place a digital mark, one shown 404, on a digital marking surface 406. A drawing-context touch-gesture proximity zone 408 may be defined in relation to the current digital-marking-device engagement point 410 and may be indicated by a drawing-context touch-gesture proximity-zone indicator 412 that indicates the perimeter of the drawing-context touch-gesture proximity zone 408. The drawing-context touch-gesture proximity-zone indicator 412 may be rendered with an initial characteristic corresponding to digital-marking-device engagement without touch-gesture detection, for example, a thin dashed line 412, as illustrated in FIG. 4, or with an alternative characteristic, for example, a thin-line flashing border or other characteristic.

However, when an initial touch contact is detected at a location within the drawing-context touch-gesture proximity zone 408, for example, at touch-gesture initial-contact location 502 shown in FIG. 5, one or more characteristics, for example, the line weight and line-dash style, of the drawing-context touch-gesture proximity-zone indicator 504 may change in response to the detected touch contact, thereby providing visual feedback to a user. Other exemplary changes are a change in drawing-context touch-gesture proximity-zone indicator color, thickness, transparency, opacity, animation (for example, flashing and other pictorial animation characteristics) and other drawing characteristics.

In alternative embodiments, illustrated in FIG. 6, the drawing-context touch-gesture proximity-zone indicator 602 may not change, but a faint rectangular filled region 604 that visually emulates a localized touch pad may be displayed in proximity to the touch contact location 502.

Upon detection of a valid touch gesture, the drawing-context touch-gesture proximity-zone indicator may further change.

Figure 7:
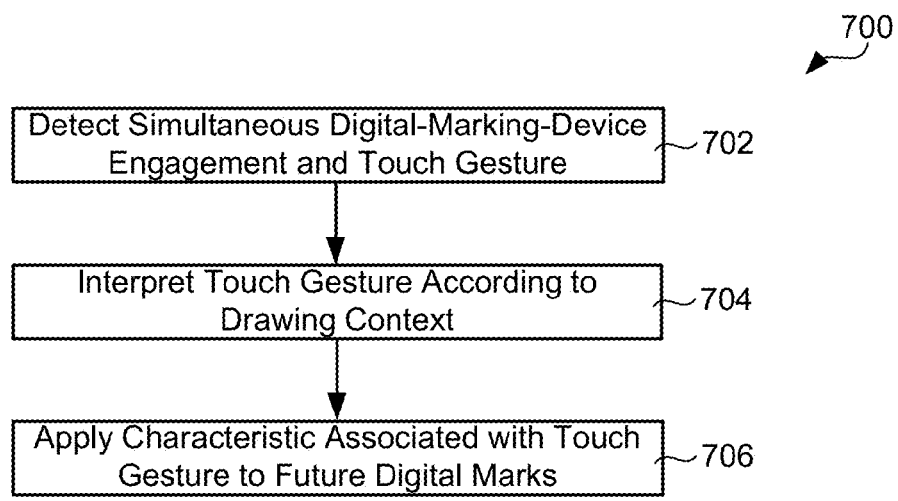
FIG. 7 is a chart depicting exemplary embodiments of the present invention comprising interpretation of a touch gesture in a drawing context when the touch gesture is performed while a digital marking device is engaged with a digital marking surface.

Some embodiments of the present invention, described in relation to FIG. 7, may comprise a method 700 for setting a digital-marking-device characteristic. Upon simultaneous detection 702 of a digital-marking-device engagement and a touch gesture, the touch gesture may be interpreted 704 according to a drawing context. A digital-marking-device characteristic associated with the touch gesture may be applied 706 to digital marks placed on a digital marking surface from the time of detection forward. Exemplary digital-marking-device characteristics may include stroke width, stroke type, stroke color, opacity and other drawing characteristics associated with the digital marking device.

Figure 8:
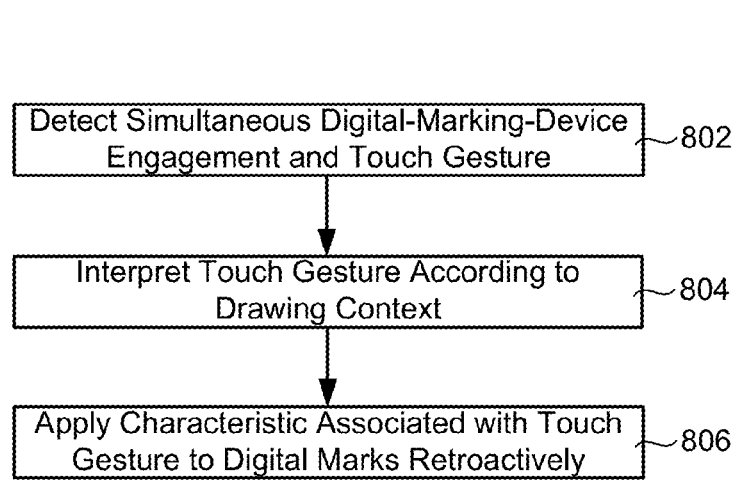
FIG. 8 is a chart depicting exemplary embodiments of the present invention comprising retroactive application of a digital-marking-device characteristic.

Some alternative embodiments of the present invention, described in relation to FIG. 8, may comprise a method 800 for setting a digital-marking-device characteristic. Upon simultaneous detection 802 of a digital-marking-device engagement and a touch gesture, the touch gesture may be interpreted 804 according to a drawing context. A digital-marking-device characteristic associated with the touch gesture may be applied 806 retroactively to digital marks placed on a digital marking surface. Exemplary digital-marking-device characteristics may include stroke width, stroke type, stroke color, opacity and other drawing characteristics associated with the digital marking device. In some embodiments of the present invention, the characteristic change may be applied retroactively to digital marks made during a current time period of continuous digital-marking-device engagement. In alternative embodiments the digital-marking-device characteristic may be applied retroactively to digital marks made during an alternative duration, for example, a duration associated with a current user, a duration associated with a marking color, a duration associated with a marking pattern, for example, a bulleted list, a numbered list and other marking patterns, or other duration.

Figure 9:
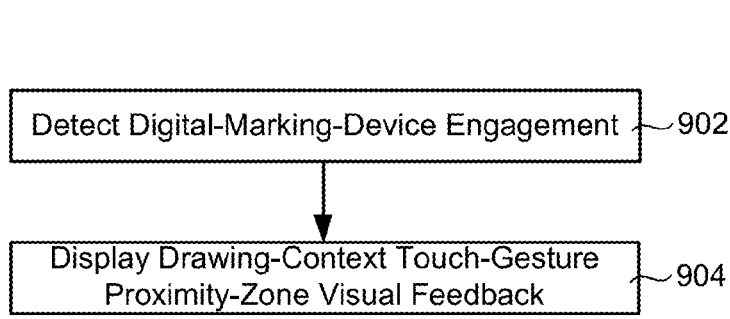
FIG. 9 is a chart depicting exemplary embodiments of the present invention comprising displaying drawing-context touch-gesture proximity-zone visual feedback.

Some embodiments of the present invention, described in relation to FIG. 9, may comprise a method 900 for indicating a drawing-context touch-gesture proximity zone. Upon detection 902 of a digital-marking-device engagement, visual feedback related to the drawing-context touch-gesture proximity zone may be displayed 904. In some embodiments of the present invention, a drawing-context touch-gesture proximity-zone indicator may be displayed in relation to a current digital-marking-device engagement point. In some embodiments of the present invention, a circular drawing-context touch-gesture proximity zone may be defined in relation to the current digital-marking-device engagement point. A touch gesture detected within the drawing-context touch-gesture proximity zone may be interpreted according to a drawing context. Alternative embodiments may comprise other-shaped drawing-context touch-gesture proximity zones. In some embodiments, the drawing-context touch-gesture proximity zone may be a closed polygon region encompassing a set of digital marks and the digital-marking-device engagement point. In some embodiments, the drawing-context touch-gesture proximity-zone indicator may comprise a faint perimeter marking, or other indicator, in relation to the current digital-marking-device engagement point.

Figure 10:
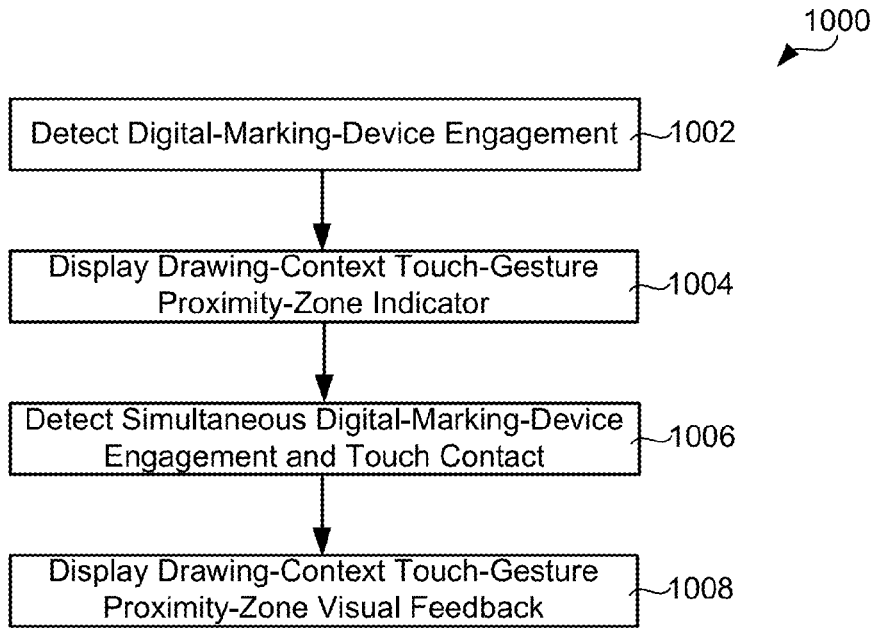
FIG. 10 is a chart depicting exemplary embodiments of the present invention comprising modification of a drawing-context touch-gesture proximity-zone indicator in response to a touch contact simultaneous with digital-marking-device engagement.

Some embodiments of the present invention, described in relation to FIG. 10, may comprise a method 1000 for providing user feedback in relation to a drawing-context touch-gesture proximity zone. Upon detection 1002 of a digital-marking-device engagement, visual feedback related to the drawing-context touch-gesture proximity zone may be displayed 1004. In some embodiments of the present invention, a drawing-context touch-gesture proximity-zone indicator may be displayed, with initial characteristics, in relation to a current digital-marking-device engagement point. In some embodiments of the present invention, a circular drawing-context touch-gesture proximity zone may be defined in relation to the current digital-marking-device engagement point. A touch gesture detected within the drawing-context touch-gesture proximity zone may be interpreted according to a drawing context. Alternative embodiments may comprise other-shaped drawing-context touch-gesture proximity zones. In some embodiments, the drawing-context touch-gesture proximity zone may be a closed polygon region encompassing a set of digital marks and the digital-marking-device engagement point. In some embodiments, the drawing-context touch-gesture proximity-zone indicator may comprise a faint perimeter marking, or other indicator, in relation to the current digital-marking-device engagement point.

Subsequently, upon detection 1006 of simultaneous digital-marking-device engagement and a touch contact, visual feedback related to the drawing-context touch-gesture proximity zone may be displayed 1008. In some embodiments, a characteristic of the current drawing-context touch-gesture proximity-zone indicator may be changed. For example, one, or more characteristics, for example, the line weight and line-dash style, of the drawing-context touch-gesture proximity-zone indicator may change in response to the detected touch contact, thereby providing visual feedback to a user. Other exemplary changes are a change in drawing-context touch-gesture proximity-zone indicator color, thickness, transparency, opacity, animation (for example, flashing and other pictorial animation characteristics) and other drawing characteristics. In alternative embodiments, drawing-context touch-gesture proximity-zone indicator may not change, but a faint rectangular filled region that visually emulates a localized touch pad may be displayed in proximity to the touch contact location.

Figure 11:
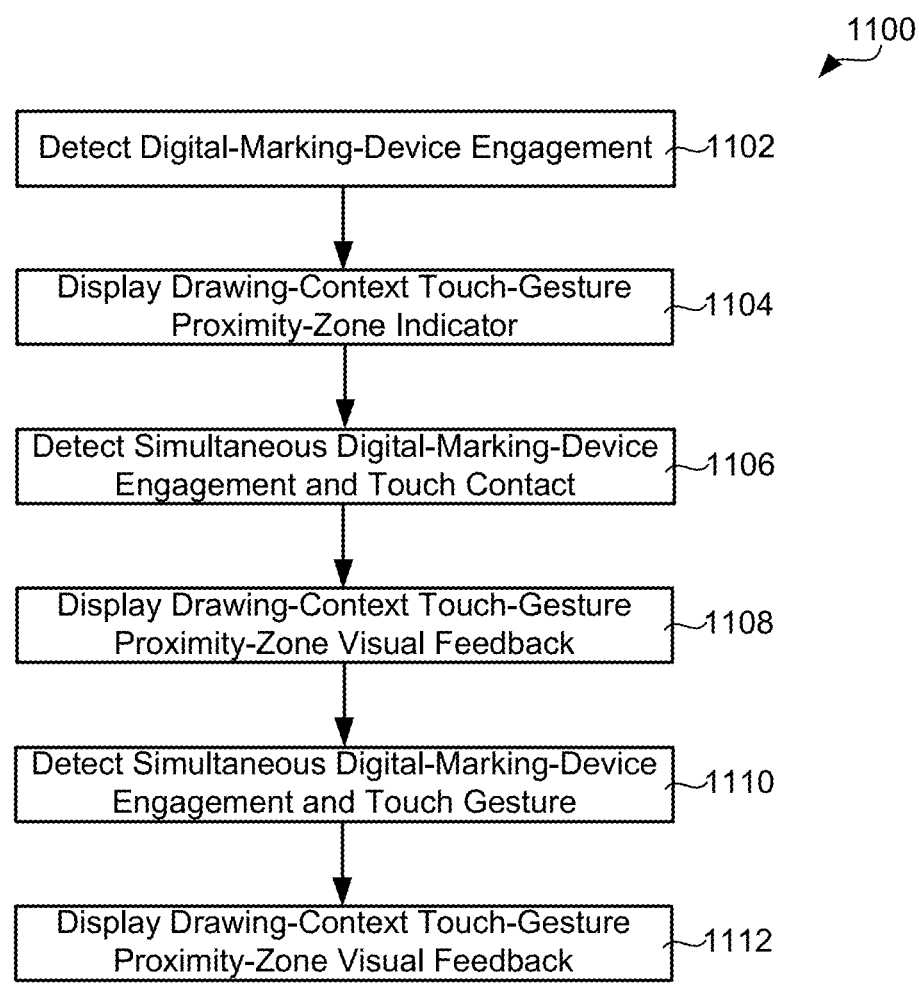
FIG. 11 is a chart depicting exemplary embodiments of the present invention comprising modification of a drawing-context touch-gesture proximity-zone indicator in response to a touch contact simultaneous with digital-marking-device engagement with further modification in response to a touch gesture.

Some embodiments of the present invention, described in relation to FIG. 11, may comprise a method 1100 for providing user feedback in relation to a drawing-context touch-gesture proximity zone. Upon detection 1102 of a digital-marking-device engagement, visual feedback related to the drawing-context touch-gesture proximity zone may be displayed 1104. In some embodiments of the present invention, a drawing-context touch-gesture proximity-zone indicator may be displayed, with initial characteristics, in relation to a current digital-marking-device engagement point. In some embodiments of the present invention, a circular drawing-context touch-gesture proximity zone may be defined in relation to the current digital-marking-device engagement point. A touch gesture detected within the drawing-context touch-gesture proximity zone may be interpreted according to a drawing context. Alternative embodiments may comprise other-shaped drawing-context touch-gesture proximity zones. In some embodiments, the drawing-context touch-gesture proximity zone may be a closed polygon region encompassing a set of digital marks and the digital-marking-device engagement point. In some embodiments, the drawing-context touch-gesture proximity-zone indicator may comprise a faint perimeter marking, or other indicator, in relation to the current digital-marking-device engagement point.

Subsequently, upon detection 1106 of simultaneous digital-marking-device engagement and a touch contact, visual feedback related to the drawing-context touch-gesture proximity zone may be displayed 1108. In some embodiments, a characteristic of the current drawing-context touch-gesture proximity-zone indicator may be changed. For example, one, or more characteristics, for example, the line weight and line-dash style, of the drawing-context touch-gesture proximity-zone indicator may change in response to the detected touch contact, thereby providing visual feedback to a user. Other exemplary changes are a change in drawing-context touch-gesture proximity-zone indicator color, thickness, transparency, opacity, animation (for example, flashing and other pictorial animation characteristics) and other drawing characteristics. In alternative embodiments, drawing-context touch-gesture proximity-zone indicator may not change, but a faint rectangular filled region that visually emulates a localized touch pad may be displayed in proximity to the touch contact location.

Subsequently, upon detection 1110 of simultaneous digital-marking-device engagement and a touch gesture, visual feedback related to the drawing-context touch-gesture proximity zone may be displayed 1112. In some embodiments, a characteristic of the current drawing-context touch-gesture proximity-zone indicator may be changed. For example, one, or more characteristics, for example, the line weight and line-dash style, of the drawing-context touch-gesture proximity-zone indicator may change in response to the detected touch contact, thereby providing visual feedback to a user. Other exemplary changes are a change in drawing-context touch-gesture proximity-zone indicator color, thickness, transparency, opacity, animation (for example, flashing and other pictorial animation characteristics) and other drawing characteristics. In alternative embodiments, drawing-context touch-gesture proximity-zone indicator may not change, but a faint rectangular filled region that visually emulates a localized touch pad may be displayed in proximity to the touch contact location.

Figure 12:
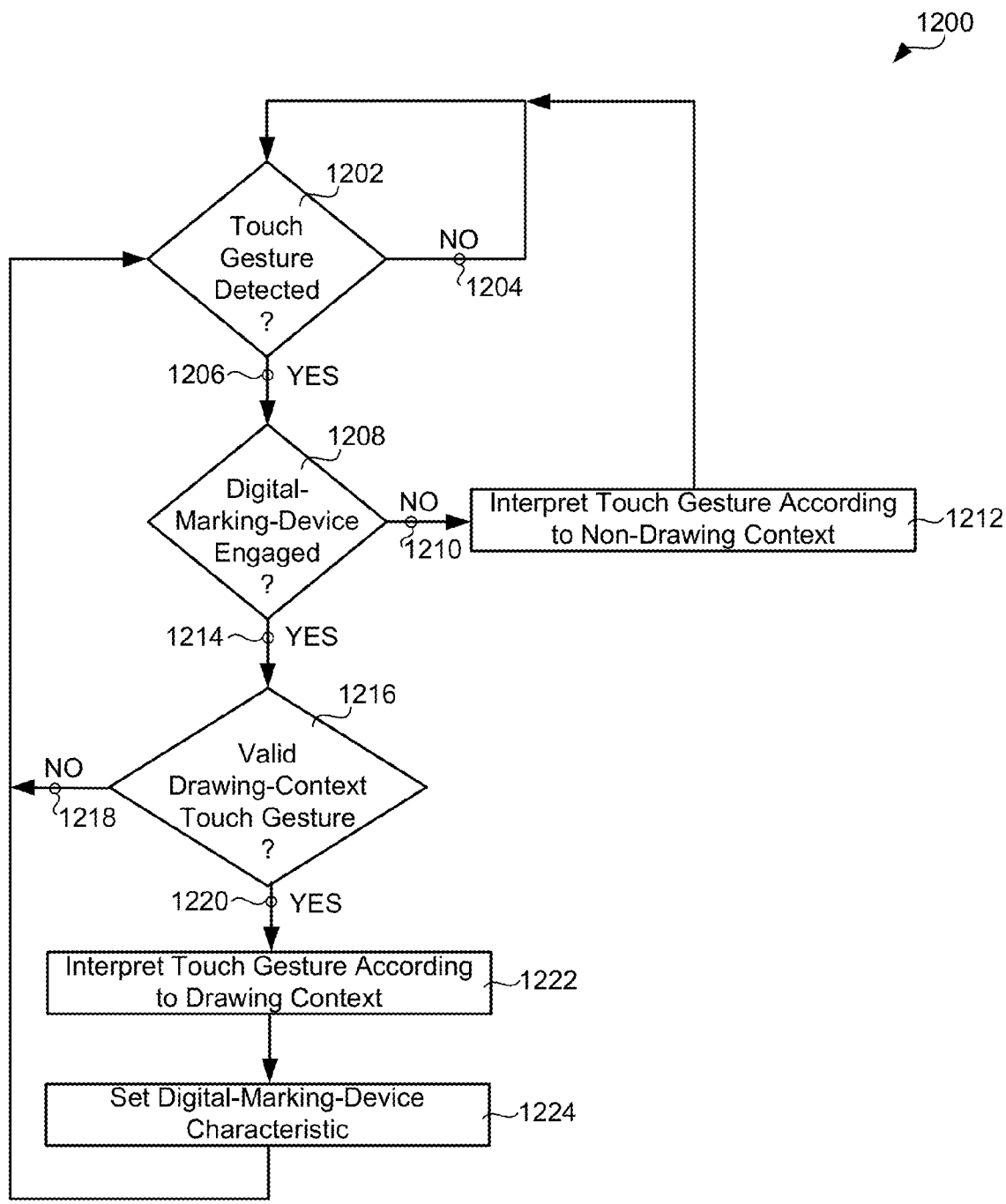
FIG. 12 is a chart depicting exemplary embodiments of the present invention comprising interpretation of a touch gesture in a drawing context when the touch gesture is performed while a digital marking device is engaged with a digital marking surface.

Some embodiments of the present invention, described in relation to FIG. 12, may comprise a method 1200 for setting a characteristic of a digital marking device. A touch-gesture detection step 1202 may be performed to determine whether or not a touch gesture has been executed on a digital writing surface. If a touch gesture is not detected 1204, the method may continue to wait for a touch gesture to be executed. If a touch gesture is detected 1206, a digital-marking-device-engagement step 1208 may be performed to determine whether or not a digital marking device is engaged at a time simultaneous to the detected touch gesture. If a digital marking device is not engaged 1210, the detected touch gesture may be interpreted 1212 according to a non-drawing context, for example, touching and dragging the ends of an image may be interpreted as a size-change gesture, a single-finger drag may be interpreted as a move gesture and other touch gestures related to actions not associated with a digital marking device. The method then may continue to monitor 1202 for a touch gesture to be executed. If a digital marking device is engaged 1214, a drawing-context touch-gesture validity check 1216 may be made to determine if the detected touch gesture is a valid drawing-context touch gesture. The validity check 1216 may comprise comparison of the received touch gesture with a library of valid gestures, may comprise determining if the touch gesture was executed in a touch-gesture proximity zone, may comprise determining if the characteristic change associated with the touch gesture is compatible with the current digital marking device or may comprise other functions associated with identifying a valid drawing-context touch gesture. If the touch gesture is not a valid drawing-context touch gesture 1218, then the method may continue to monitor 1202 for a touch gesture to be executed. If the touch gesture is a valid drawing-context touch gesture 1220, then the touch gesture may be interpreted 1222 according to a drawing context. A digital-marking-device characteristic associated with the touch gesture may be set 1224, and subsequent digital marks made by the digital-marking-device with be made with the new digital-marking-device characteristic. Exemplary digital-marking-device characteristics may include stroke width, stroke type, stroke color, opacity and other drawing characteristics associated with the digital marking device.

Figure 13:
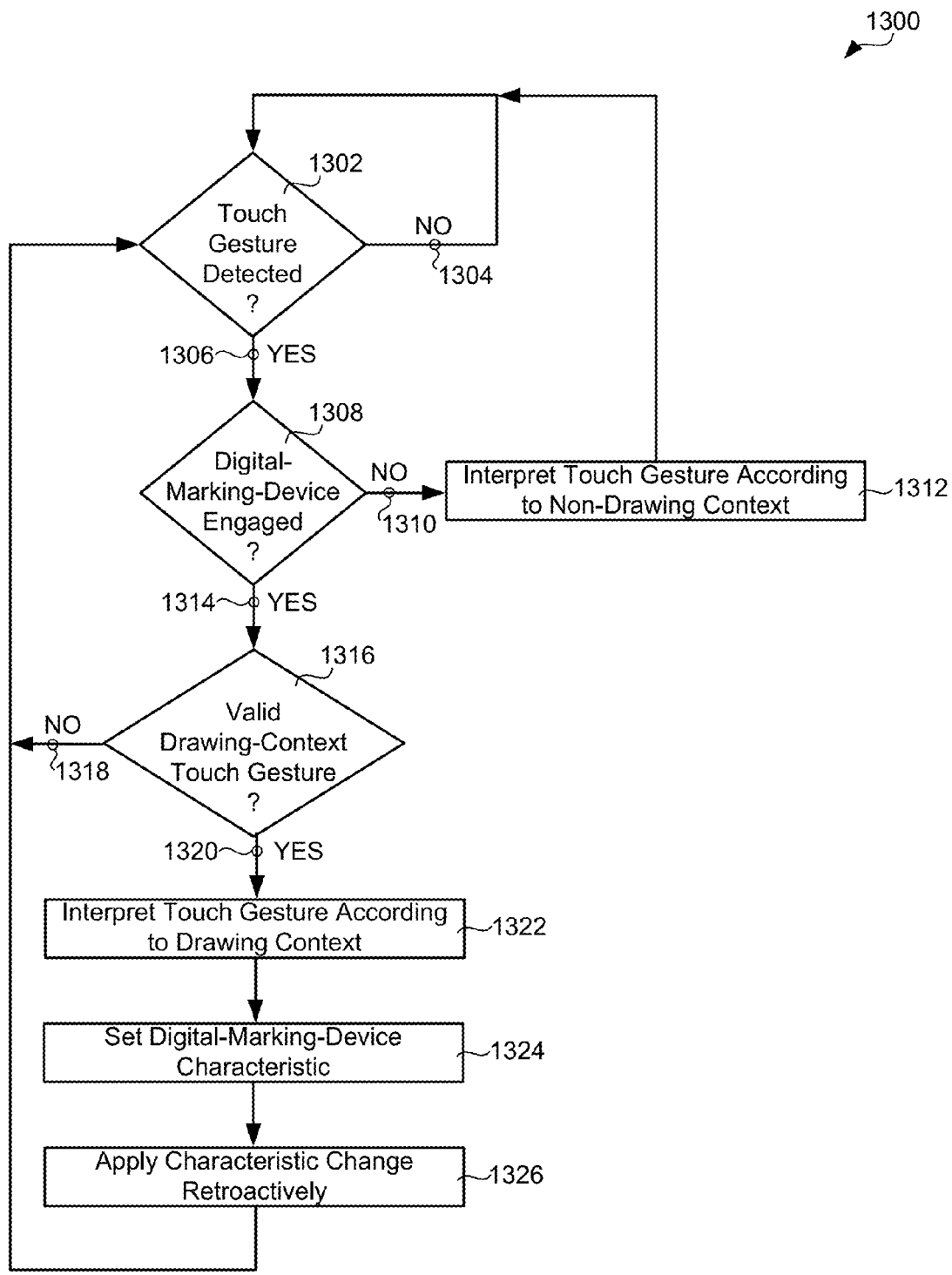
FIG. 13 is a chart depicting exemplary embodiments of the present invention comprising interpretation of a touch gesture in a drawing context when the touch gesture is performed while a digital marking device is engaged with a digital marking surface and retroactively applying a digital-marking-device characteristic associated with the drawing-context touch-gesture interpretation.

Some embodiments of the present invention, described in relation to FIG. 13, may comprise a method 1300 for setting a characteristic of a digital marking device. A touch-gesture detection step 1302 may be performed to determine whether or not a touch gesture has been executed on a digital writing surface. If a touch gesture is not detected 1304, the method may continue to monitor 1302 for a touch gesture to be executed. If a touch gesture is detected 1306, a digital-marking-device-engagement step 1308 may be performed to determine whether or not a digital marking device is engaged at a time simultaneous to the detected touch gesture. If a digital marking device is not engaged 1310, the detected touch gesture may be interpreted 1312 according to a non-drawing context, for example, touching and dragging the ends of an image may be interpreted as a size-change gesture, a single-finger drag may be interpreted as a move gesture and other touch gestures related to actions not associated with a digital marking device. The method then may continue to wait for a touch gesture to be executed. If a digital marking device is engaged 1314, a drawing-context touch-gesture validity check 1316 may be made to determine if the detected touch gesture is a valid drawing-context touch gesture. The validity check 1316 may comprise comparison of the received touch gesture with a library of valid gestures, may comprise determining if the touch gesture was executed in a touch-gesture proximity zone, may comprise determining if the characteristic change associated with the touch gesture is compatible with the current digital marking device or may comprise other functions associated with identifying a valid drawing-context touch gesture. If the touch gesture is not a valid drawing-context touch gesture 1318, then the method may continue to monitor 1302 for a touch gesture to be executed. If the touch gesture is a valid drawing-context touch gesture 1320, then the touch gesture may be interpreted 1322 according to a drawing context. A digital-marking-device characteristic associated with the touch gesture may be set 1324. Exemplary digital-marking-device characteristics may include stroke width, stroke type, stroke color, fill color, fill pattern, border style, opacity and other drawing characteristics associated with the digital marking device. The digital-marking-device characteristic may be applied retroactively 1326. In some embodiments of the present invention, the characteristic change may be applied retroactively to digital marks made during a current time period of continuous digital-marking-device engagement. In alternative embodiments the digital-marking-device characteristic may be applied retroactively to digital marks made during an alternative duration, for example, a duration associated with a current user, a duration associated with a marking color, a duration associated with a marking pattern, for example, a bulleted list, a numbered list and other marking patterns, or other duration.

Figure 14:
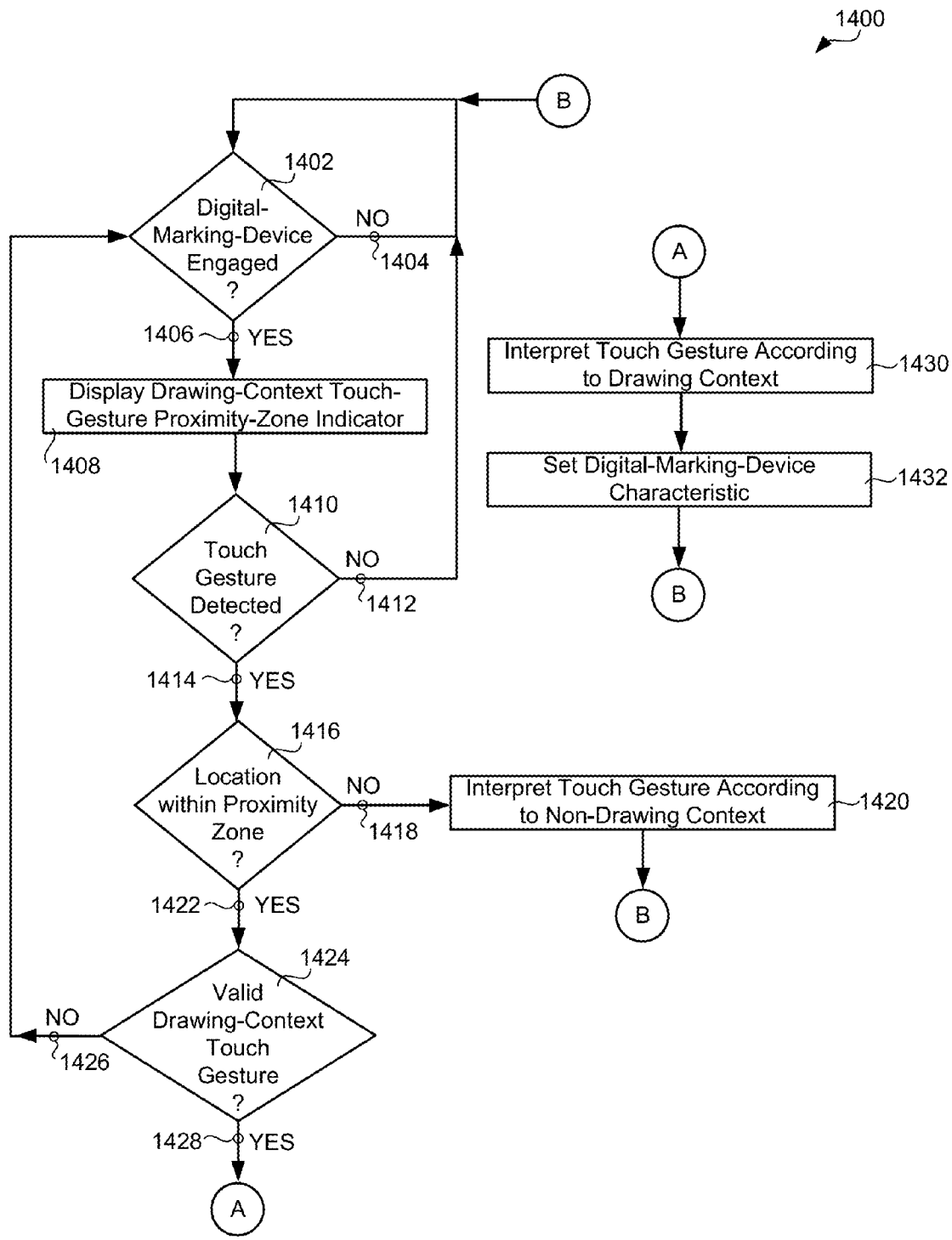
FIG. 14 is a chart depicting exemplary embodiments of the present invention comprising interpretation of a touch gesture in a drawing context when the touch gesture is performed while a digital marking device is engaged with a digital marking surface and when the touch gesture is made within a proximity zone associated with the current engagement point of the digital marking device.

Some embodiments of the present invention, described in relation to FIG. 14, may comprise a method 1400 for setting a characteristic of a digital marking device. A digital-marking-device-engagement step 1402 may be performed to determine whether or not a digital marking device is engaged. If a digital marking device is not engaged 1404, then the method may continue to monitor 1402 digital-marking-device engagement. If a digital marking device is engaged 1406, a drawing-context touch-gesture proximity-zone indicator maybe displayed 1408. A touch-gesture detection step 1410 may be performed to determine whether or not a touch gesture has been executed on a digital writing surface. If a touch gesture is not detected 1412, the method may continue to monitor 1402 digital-marking-device engagement. If a touch gesture is detected 1414, a determination of the location of the touch gesture may be made 1416. If the touch gesture is not 1418 within a proximity zone associated with the digital-marking-device engagement point, then the detected touch gesture may be interpreted 1420 according to a non-drawing context, for example, touching and dragging the ends of an image may be interpreted as a size-change gesture, a single-finger drag may be interpreted as a move gesture and other touch gestures related to actions not associated with a digital marking device. The method then may continue 1402 to monitor digital-marking-device engagement. If the touch gesture is 1422 within the proximity zone, a drawing-context touch-gesture validity check 1424 may be made to determine if the detected touch gesture is a valid drawing-context touch gesture. The validity check 1424 may comprise comparison of the received touch gesture with a library of valid gestures, may comprise determining if the characteristic change associated with the touch gesture is compatible with the current digital marking device or may comprise other functions associated with identifying a valid drawing-context touch gesture. If the touch gesture is not a valid drawing-context touch gesture 1426, then the method may continue to monitor 1402 digital-marking-device engagement. If the touch gesture is a valid drawing-context touch gesture 1428, then the touch gesture may be interpreted 1430 according to a drawing context. A digital-marking-device characteristic associated with the touch gesture may be set 1432. Exemplary digital-marking-device characteristics may include stroke width, stroke type, stroke color, fill color, fill pattern, border style, opacity and other drawing characteristics associated with the digital marking device. The method may continue to monitor 1402 digital-marking-device engagement.

Some embodiments of the present invention, described in relation to FIG. 15, may comprise a method 1500 for setting a characteristic of a digital marking device. A digital-marking-device-engagement step 1502 may be performed to determine whether or not a digital marking device is engaged. If a digital marking device is not engaged 1504, then the method may continue to monitor 1502 digital-marking-device engagement. If a digital marking device is engaged 1506, a drawing-context touch-gesture proximity-zone indicator maybe displayed 1508. A touch-gesture detection step 1510 may be performed to determine whether or not a touch gesture has been executed on a digital writing surface. If a touch gesture is not detected 1512, the method may continue to monitor 1502 digital-marking-device engagement. If a touch gesture is detected 1514, a determination of the location of the touch gesture may be made 1516.

If the touch gesture is not 1518 within a proximity zone associated with the digital-marking-device engagement point, then the detected touch gesture may be interpreted 1520 according to a non-drawing context, for example, touching and dragging the ends of an image may be interpreted as a size-change gesture, a single-finger drag may be interpreted as a move gesture and other touch gestures related to actions not associated with a digital marking device. The method then may continue to monitor 1502 digital-marking-device engagement. If the touch gesture is 1522 within the proximity zone, a drawing-context touch-gesture validity check 1524 may be made to determine if the detected touch gesture is a valid drawing-context touch gesture. The validity check 1524 may comprise comparison of the received touch gesture with a library of valid gestures, may comprise determining if the characteristic change associated with the touch gesture is compatible with the current digital marking device or may comprise other functions associated with identifying a valid drawing-context touch gesture. If the touch gesture is not a valid drawing-context touch gesture 1526, then the method may continue to monitor 1502 digital-marking-device engagement. If the touch gesture is a valid drawing-context touch gesture 1528, then the touch gesture may be interpreted 1530 according to a drawing context. A digital-marking-device characteristic associated with the touch gesture may be set 1532. Exemplary digital-marking-device characteristics may include stroke width, stroke type, stroke color, fill color, fill pattern, border style, opacity and other drawing characteristics associated with the digital marking device. The digital-marking-device characteristic may be applied retroactively 1534. In some embodiments of the present invention, the characteristic change may be applied retroactively to digital marks made during a current time period of continuous digital-marking-device engagement. In alternative embodiments the digital-marking-device characteristic may be applied retroactively to digital marks made during an alternative duration, for example, a duration associated with a current user, a duration associated with a marking color, a duration associated with a marking pattern, for example, a bulleted list, a numbered list and other marking patterns, or other duration. The method may continue to monitor 1502 digital-marking-device engagement.

Some embodiments of the present invention, described in relation to FIG. 16A and FIG. 16B, may comprise a method 1600 for setting a characteristic of a digital marking device. A digital-marking-device-engagement step 1602 may be performed to determine whether or not a digital marking device is engaged. If a digital marking device is not engaged 1604, then the method may continue to monitor 1602 digital-marking-device engagement. If a digital marking device is engaged 1606, a drawing-context touch-gesture proximity-zone indicator maybe displayed 1608. A touch-contact detection step 1610 may be performed to determine whether or not a touch contact has been made on a digital writing surface. If a touch contact is not detected 1612, the method may continue to monitor 1602 digital-marking-device engagement. If a touch contact is detected 1614, a determination of the location of the touch contact may be made 1616. If the touch gesture is not 1618 within a proximity zone associated with the digital-marking-device engagement point, then a touch-gesture detection step 1620 may be performed to determine whether or not a touch gesture has been executed on the digital writing surface. If a touch gesture is not detected 1622, the method may continue to monitor 1602 digital-marking-device engagement. If a touch gesture is detected 1624, then the detected touch gesture may be interpreted 1626 according to a non-drawing context, for example, touching and dragging the ends of an image may be interpreted as a size-change gesture, a single-finger drag may be interpreted as a move gesture and other touch gestures related to actions not associated with a digital marking device. The method then may continue to monitor 1602 digital-marking-device engagement. If the touch gesture is 1628 within the proximity zone associated with the digital-marking-device engagement point, drawing-context touch-gesture proximity-zone visual feedback may be provided 1630, and a touch-gesture detection step 1632 may be performed to determine whether or not a touch gesture has been executed on the digital writing surface. If a touch gesture is not detected 1634, the method may continue to monitor 1602 digital-marking-device engagement. If a touch gesture is detected 1636, then a drawing-context touch-gesture validity check 1638 may be made to determine if the detected touch gesture is a valid drawing-context touch gesture. The validity check 1638 may comprise comparison of the received touch gesture with a library of valid gestures, may comprise determining if the characteristic change associated with the touch gesture is compatible with the current digital marking device or may comprise other functions associated with identifying a valid drawing-context touch gesture. If the touch gesture is not a valid drawing-context touch gesture 1640, then the method may continue to monitor 1602 digital-marking-device engagement. If the touch gesture is a valid drawing-context touch gesture 1642, then the touch gesture may be interpreted 1644 according to a drawing context. A digital-marking-device characteristic associated with the touch gesture may be set 1646. Exemplary digital-marking-device characteristics may include stroke width, stroke type, stroke color, fill color, fill pattern, border style, opacity and other drawing characteristics associated with the digital marking device. The method may continue to monitor 1602 digital-marking-device engagement.

Some embodiments of the present invention, described in relation to FIG. 17A and FIG. 17B, may comprise a method 1700 for setting a characteristic of a digital marking device. A digital-marking-device-engagement step 1702 may be performed to determine whether or not a digital marking device is engaged. If a digital marking device is not engaged 1704, then the method may continue to monitor 1702 digital-marking-device engagement. If a digital marking device is engaged 1706, a drawing-context touch-gesture proximity-zone indicator maybe displayed 1708. A touch-contact detection step 1710 may be performed to determine whether or not a touch contact has been made on a digital writing surface. If a touch contact is not detected 1712, the method may continue to monitor 1702 digital-marking-device engagement. If a touch contact is detected 1714, a determination of the location of the touch contact may be made 1716. If the touch gesture is not 1718 within a proximity zone associated with the digital-marking-device engagement point, then a touch-gesture detection step 1720 may be performed to determine whether or not a touch gesture has been executed on the digital writing surface. If a touch gesture is not detected 1722, the method may continue to monitor 1702 digital-marking-device engagement. If a touch gesture is detected 1724, then the detected touch gesture may be interpreted 1726 according to a non-drawing context, for example, touching and dragging the ends of an image may be interpreted as a size-change gesture, a single-finger drag may be interpreted as a move gesture and other touch gestures related to actions not associated with a digital marking device. The method then may continue to monitor 1602 digital-marking-device engagement. If the touch gesture is 1728 within the proximity zone associated with the digital-marking-device engagement point, drawing-context touch-gesture proximity-zone visual feedback may be provided 1730, and a touch-gesture detection step 1732 may be performed to determine whether or not a touch gesture has been executed on the digital writing surface. If a touch gesture is not detected 1734, the method may continue to monitor 1702 digital-marking-device engagement. If a touch gesture is detected 1736, then a drawing-context touch-gesture validity check 1738 may be made to determine if the detected touch gesture is a valid drawing-context touch gesture. The validity check 1738 may comprise comparison of the received touch gesture with a library of valid gestures, may comprise determining if the characteristic change associated with the touch gesture is compatible with the current digital marking device or may comprise other functions associated with identifying a valid drawing-context touch gesture. If the touch gesture is not a valid drawing-context touch gesture 1740, then the method may continue to monitor 1702 digital-marking-device engagement. If the touch gesture is a valid drawing-context touch gesture 1742, then the touch gesture may be interpreted 1744 according to a drawing context. A digital-marking-device characteristic associated with the touch gesture may be set 1746. Exemplary digital-marking-device characteristics may include stroke width, stroke type, stroke color, fill color, fill pattern, border style, opacity and other drawing characteristics associated with the digital marking device. The digital-marking-device characteristic may be applied retroactively 1748. In some embodiments of the present invention, the characteristic change may be applied retroactively to digital marks made during a current time period of continuous digital-marking-device engagement. In alternative embodiments the digital-marking-device characteristic may be applied retroactively to digital marks made during an alternative duration, for example, a duration associated with a current user, a duration associated with a marking color, a duration associated with a marking pattern, for example, a bulleted list, a numbered list and other marking patterns, or other duration. The method may continue to monitor 1702 digital-marking-device engagement.

Some embodiments of the present invention, described in relation to FIG. 18A and FIG. 18B, may comprise a method 1800 for setting a characteristic of a digital marking device. A digital-marking-device-engagement step 1802 may be performed to determine whether or not a digital marking device is engaged. If a digital marking device is not engaged 1804, then the method may continue to monitor 1802 digital-marking-device engagement. If a digital marking device is engaged 1806, a drawing-context touch-gesture proximity-zone indicator maybe displayed 1808. A touch-contact detection step 1810 may be performed to determine whether or not a touch contact has been made on a digital writing surface. If a touch contact is not detected 1812, the method may continue to monitor 1802 digital-marking-device engagement. If a touch contact is detected 1814, a determination of the location of the touch contact may be made 1816. If the touch gesture is not 1818 within a proximity zone associated with the digital-marking-device engagement point, then a touch-gesture detection step 1820 may be performed to determine whether or not a touch gesture has been executed on the digital writing surface. If a touch gesture is not detected 1822, the method may continue to monitor 1802 digital-marking-device engagement. If a touch gesture is detected 1824, then the detected touch gesture may be interpreted 1826 according to a non-drawing context, for example, touching and dragging the ends of an image may be interpreted as a size-change gesture, a single-finger drag may be interpreted as a move gesture and other touch gestures related to actions not associated with a digital marking device. The method then may continue to monitor 1802 digital-marking-device engagement. If the touch gesture is 1828 within the proximity zone associated with the digital-marking-device engagement point, drawing-context touch-gesture proximity-zone visual feedback may be provided 1830, and a touch-gesture detection step 1832 may be performed to determine whether or not a touch gesture has been executed on the digital writing surface. If a touch gesture is not detected 1834, the method may continue to monitor 1802 digital-marking-device engagement. If a touch gesture is detected 1836, then drawing-context touch-gesture proximity-zone visual feedback may be provided 1838, and a drawing-context touch-gesture validity check 1840 may be made to determine if the detected touch gesture is a valid drawing-context touch gesture. The validity check 1840 may comprise comparison of the received touch gesture with a library of valid gestures, may comprise determining if the characteristic change associated with the touch gesture is compatible with the current digital marking device or may comprise other functions associated with identifying a valid drawing-context touch gesture. If the touch gesture is not a valid drawing-context touch gesture 1842, then the method may continue to monitor 1802 digital-marking-device engagement. If the touch gesture is a valid drawing-context touch gesture 1844, then the touch gesture may be interpreted 1846 according to a drawing context. A digital-marking-device characteristic associated with the touch gesture may be set 1848. Exemplary digital-marking-device characteristics may include stroke width, stroke type, stroke color, fill color, fill pattern, border style, opacity and other drawing characteristics associated with the digital marking device. The method may continue to monitor 1802 digital-marking-device engagement.

Some embodiments of the present invention, described in relation to FIG. 19A and FIG. 19B, may comprise a method 1900 for setting a characteristic of a digital marking device. A digital-marking-device-engagement step 1902 may be performed to determine whether or not a digital marking device is engaged. If a digital marking device is not engaged 1904, then the method may continue to monitor 1902 digital-marking-device engagement. If a digital marking device is engaged 1906, a drawing-context touch-gesture proximity-zone indicator maybe displayed 1908. A touch-contact detection step 1910 may be performed to determine whether or not a touch contact has been made on a digital writing surface. If a touch contact is not detected 1912, the method may continue to monitor 1902 digital-marking-device engagement. If a touch contact is detected 1914, a determination of the location of the touch contact may be made 1916. If the touch gesture is not 1918 within a proximity zone associated with the digital-marking-device engagement point, then a touch-gesture detection step 1820 may be performed to determine whether or not a touch gesture has been executed on the digital writing surface. If a touch gesture is not detected 1922, the method may continue to monitor 1902 digital-marking-device engagement. If a touch gesture is detected 1924, then the detected touch gesture may be interpreted 1926 according to a non-drawing context, for example, touching and dragging the ends of an image may be interpreted as a size-change gesture, a single-finger drag may be interpreted as a move gesture and other touch gestures related to actions not associated with a digital marking device. The method then may continue to monitor 1902 digital-marking-device engagement. If the touch gesture is 1928 within the proximity zone associated with the digital-marking-device engagement point, drawing-context touch-gesture proximity-zone visual feedback may be provided 1930, and a touch-gesture detection step 1932 may be performed to determine whether or not a touch gesture has been executed on the digital writing surface. If a touch gesture is not detected 1934, the method may continue to monitor 1902 digital-marking-device engagement. If a touch gesture is detected 1936, then drawing-context touch-gesture proximity-zone visual feedback may be provided 1938, and a drawing-context touch-gesture validity check 1940 may be made to determine if the detected touch gesture is a valid drawing-context touch gesture. The validity check 1940 may comprise comparison of the received touch gesture with a library of valid gestures, may comprise determining if the characteristic change associated with the touch gesture is compatible with the current digital marking device or may comprise other functions associated with identifying a valid drawing-context touch gesture. If the touch gesture is not a valid drawing-context touch gesture 1942, then the method may continue to monitor 1902 digital-marking-device engagement. If the touch gesture is a valid drawing-context touch gesture 1944, then the touch gesture may be interpreted 1946 according to a drawing context. A digital-marking-device characteristic associated with the touch gesture may be set 1948. Exemplary digital-marking-device characteristics may include stroke width, stroke type, stroke color, fill color, fill pattern, border style, opacity and other drawing characteristics associated with the digital marking device. The digital-marking-device characteristic may be applied retroactively 1950. In some embodiments of the present invention, the characteristic change may be applied retroactively to digital marks made during a current time period of continuous digital-marking-device engagement. In alternative embodiments the digital-marking-device characteristic may be applied retroactively to digital marks made during an alternative duration, for example, a duration associated with a current user, a duration associated with a marking color, a duration associated with a marking pattern, for example, a bulleted list, a numbered list and other marking patterns, or other duration. The method may continue to monitor 1902 digital-marking-device engagement.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for setting a characteristic associated with a digital marking device, said method comprising:
   detecting a digital-marking-device engagement of said digital marking device with a digital marking surface;
   displaying, on said digital marking surface, a drawing-context touch-gesture proximity-zone indicator forming a perimeter of a drawing-context touch-gesture proximity zone;
   detecting a first touch gesture while said digital marking device remains engaged with said digital marking surface, wherein said first touch gesture is detected within said drawing-context touch-gesture proximity zone, and said digital-marking-device engagement and said first touch gesture are separate events;
   interpreting said first touch gesture according to a drawing context;
   modifying a drawing-context touch-gesture proximity zone indicator in response to detecting said first touch gesture;
   setting said characteristic associated with said digital marking device according to said interpretation of said first touch gesture; and
   applying said characteristic to a first digital mark on said digital marking surface, wherein said applying effectuates a change in a display characteristic, of said first digital mark, in accordance with said interpretation of said first touch gesture.

2. A method for setting a characteristic associated with a digital marking device, said method comprising:
   detecting a digital-marking-device engagement of said digit marking device with a digital marking surface;
   displaying, on said digital marking surface, a drawing-context touch-gesture proximity-zone indicator, wherein said drawing-context touch-gesture proximity-zone indicator indicates the perimeter of said drawing-context touch-gesture proximity zone, wherein said drawing-context touch-gesture proximity zone is a closed polygon region encompassing a set of digital marks and the digital-marking-device engagement point;
   detecting a first touch gesture while said digital marking device remains engaged with said digital marking surface, wherein said first touch gesture is detected within a drawing-context touch-gesture proximity zone associated with said drawing-context touch-gesture proximity-zone indicator and said digital-marking-device engagement and said first touch gesture are separate events;
   interpreting said first touch gesture according to a drawing context; and
   setting said characteristic associated with said digital marking device according to said interpretation of said first touch gesture.

3. A method for setting a characteristic associated with a digital marking device, said method comprising:
   detecting a digital-marking-device engagement of said digital marking device with a digital marking surface;

displaying, on said digital marking surface, a drawing-context touch-gesture proximity-zone indicator forming a perimeter of a drawing-context touch-gesture proximity zone;

detecting a first touch contact, wherein said first touch contact is within said drawing-context touch-gesture proximity zone;

modifying a drawing-context touch-gesture proximity-zone indicator in response to said detecting said first touch contact;

detecting a first touch gesture while said digital marking device remains engaged with said digital marking surface, Wherein said first touch gesture is detected within said drawing-context touch-gesture proximity zone, and said digital-marking-device engagement and said first touch gesture are separate events;

interpreting said first touch gesture according to a drawing context;

setting said characteristic associated with said d ital marking device according to said interpretation of said first touch gesture; and applying said characteristic to a first digital mark on said marking surface, wherein said applying effectuates a change in a display characteristic, of said first digital mark, in accordance with said interpretation of said first touch gesture.

4. The method as described in claim 3 further comprising modifying said modified drawing-context touch-gesture proximity zone indicator in response to detecting said first touch gesture.

5. A method for setting a characteristic associated with a digital marking device, said method comprising:

detecting a digital-marking-device engagement of said digital marking device with a digital marking surface;

displaying, on said digital marking surface, a drawing-context touch-gesture proximity-zone indicator forming a perimeter of a drawing-context touch-gesture proximity zone;

detecting a first touch contact while said digital marking device remains engaged with said digital marking surface;

when said first touch contact is located within said drawing-context touch-gesture proximity zone, modifying said drawing-context touch-gesture proximity-zone indicator;

detecting a first touch gesture while said digital marking device remains engaged with said digital marking surface, wherein and said digital-marking-device engagement and said first touch gesture are separate events;

when said first touch gesture is located within said drawing-context touch-gesture proximity zone:

modifying said modified drawing-context touch-gesture proximity-zone indicator;

determining if said first touch gesture is a valid drawing-context touch gesture;

when said first touch gesture is a valid drawing-context touch gesture, interpreting said first touch gesture according to a drawing context;

setting said characteristic associated with said digital marking device according to said interpretation of said first touch gesture; and applying said characteristic to a first digital mark on said digital marking surface, wherein said applying effectuates a change in a display characteristic, of said first digital mark, in accordance with said interpretation of said first touch gesture.

* * * * *

UNITED STATES PATENT AND TRADEMARK OFFICE
CERTIFICATE OF CORRECTION

| | |
|---|---|
| PATENT NO. | : 9,448,684 B2 |
| APPLICATION NO. | : 13/623896 |
| DATED | : September 20, 2016 |
| INVENTOR(S) | : Neil Runde et al. |

It is certified that error appears in the above-identified patent and that said Letters Patent is hereby corrected as shown below:

In the Claims

In column 19, line 19, claim 3, the word "digital" has been incorrectly printed as --d ital--.

Signed and Sealed this
Eighth Day of November, 2016

Michelle K. Lee
*Director of the United States Patent and Trademark Office*